US008136140B2

(12) United States Patent
Hodge

(10) Patent No.: US 8,136,140 B2
(45) Date of Patent: Mar. 13, 2012

(54) METHODS AND APPARATUS FOR GENERATING METADATA UTILIZED TO FILTER CONTENT FROM A VIDEO STREAM USING TEXT DATA

(75) Inventor: Kenneth Robert Hodge, Castle Rock, CO (US)

(73) Assignee: DISH Network L.L.C., Englewood, CO (US)

( * ) Notice: Subject to any disclaimer, the term of this patent is extended or adjusted under 35 U.S.C. 154(b) by 685 days.

(21) Appl. No.: 11/942,896

(22) Filed: Nov. 20, 2007

(65) Prior Publication Data
US 2009/0133093 A1 May 21, 2009

(51) Int. Cl.
*H04N 7/173* (2006.01)
(52) U.S. Cl. .............................. 725/88; 725/32; 348/460
(58) Field of Classification Search ..................... 725/88, 725/35, 36
See application file for complete search history.

(56) References Cited

U.S. PATENT DOCUMENTS

| | | | |
|---|---|---|---|
| 3,682,363 A | 8/1972 | Hull | |
| 3,919,479 A | 11/1975 | Moon | |
| 3,942,190 A | 3/1976 | Detwiler | |
| 4,224,481 A | 9/1980 | Russell | |
| 4,313,135 A | 1/1982 | Cooper | |
| 4,331,974 A | 5/1982 | Cogswell et al. | |
| 4,388,659 A | 6/1983 | Lemke | |
| 4,404,589 A | 9/1983 | Wright, Jr. | |
| 4,408,309 A | 10/1983 | Kiesling et al. | |
| 4,439,785 A | 3/1984 | Leonard | |
| 4,450,531 A | 5/1984 | Kenyon | |
| 4,520,404 A | 5/1985 | Von Kohorn | |
| 4,602,297 A | 7/1986 | Reese | |
| 4,605,964 A | 8/1986 | Chard | |
| 4,633,331 A | 12/1986 | McGrady et al. | |
| 4,665,431 A | 5/1987 | Cooper | |
| 4,697,209 A | 9/1987 | Kiewit | |
| 4,706,121 A | 11/1987 | Young | |
| 4,739,398 A | 4/1988 | Thomas | |
| 4,755,889 A | 7/1988 | Schwartz | |
| 4,760,442 A | 7/1988 | O'Connell et al. | |
| 4,761,694 A | 8/1988 | Shudo et al. | |

(Continued)

FOREIGN PATENT DOCUMENTS

EP 521454 1/1993

(Continued)

OTHER PUBLICATIONS

U.S. Appl. No. 12/052,623, filed Mar. 20, 2008 in the name of Max S. Gratton.

(Continued)

*Primary Examiner* — Pankaj Kumar
*Assistant Examiner* — Timothy Newlin
(74) *Attorney, Agent, or Firm* — Max S. Gratton

(57) ABSTRACT

Various embodiments of apparatus, systems and/or methods are described for generating metadata utilized by a DVR to filter content from a video stream. A video stream is reviewed to identify portions the video stream to skip during presentation of the video stream. Text data associated with the video stream is parsed to identify a string in the text data that identifies boundaries of the portions of the video stream that are to be skipped during presentation by the DVR. The string is provided to the DVR, and the DVR utilizes the string to skip the portion of the video stream during presentation of the video stream by the DVR.

20 Claims, 13 Drawing Sheets

U.S. PATENT DOCUMENTS

| | | | |
|---|---|---|---|
| 4,789,961 A | 12/1988 | Tindall |
| 4,805,217 A | 2/1989 | Morihiro et al. |
| 4,816,905 A | 3/1989 | Tweedy et al. |
| 4,833,710 A | 5/1989 | Hirashima |
| 4,876,670 A | 10/1989 | Nakabayashi |
| 4,888,769 A | 12/1989 | Deal |
| 4,891,715 A | 1/1990 | Levy |
| 4,897,867 A | 1/1990 | Foster et al. |
| 4,916,682 A | 4/1990 | Tomoda et al. |
| 4,918,730 A | 4/1990 | Schulze |
| 4,920,533 A | 4/1990 | Dufresne et al. |
| 4,930,160 A | 5/1990 | Vogel |
| 4,939,594 A | 7/1990 | Moxon et al. |
| 4,947,244 A | 8/1990 | Fenwick et al. |
| 4,949,169 A | 8/1990 | Lumelsky et al. |
| 4,949,187 A | 8/1990 | Cohen |
| 4,963,866 A | 10/1990 | Duncan |
| 4,963,995 A | 10/1990 | Lang |
| 4,972,190 A | 11/1990 | Primeau et al. |
| 4,974,085 A | 11/1990 | Campbell et al. |
| RE33,535 E | 2/1991 | Cooper |
| 4,991,033 A | 2/1991 | Takeshita |
| 5,014,125 A | 5/1991 | Pocock et al. |
| 5,057,932 A | 10/1991 | Lang |
| 5,063,453 A | 11/1991 | Yoshimura et al. |
| 5,093,718 A | 3/1992 | Hoarty et al. |
| 5,121,476 A | 6/1992 | Yee |
| 5,126,852 A | 6/1992 | Nishino et al. |
| 5,126,982 A | 6/1992 | Yifrach |
| 5,130,792 A | 7/1992 | Tindell et al. |
| 5,132,992 A | 7/1992 | Yurt et al. |
| 5,134,499 A | 7/1992 | Sata et al. |
| 5,168,353 A | 12/1992 | Walker |
| 5,191,410 A | 3/1993 | McCalley et al. |
| 5,202,761 A | 4/1993 | Cooper |
| 5,227,876 A | 7/1993 | Cucchi et al. |
| 5,233,423 A | 8/1993 | Jernigan et al. |
| 5,241,428 A | 8/1993 | Goldwasser et al. |
| 5,245,430 A | 9/1993 | Nishimura |
| 5,247,347 A | 9/1993 | Litteral et al. |
| 5,253,275 A | 10/1993 | Yurt et al. |
| 5,311,423 A | 5/1994 | Clark |
| 5,329,320 A | 7/1994 | Yifrach |
| 5,333,091 A | 7/1994 | Iggulden et al. |
| 5,357,276 A | 10/1994 | Banker et al. |
| 5,361,261 A | 11/1994 | Edem et al. |
| 5,371,551 A | 12/1994 | Logan et al. |
| 5,412,416 A | 5/1995 | Nemirofsky |
| 5,414,455 A | 5/1995 | Hooper et al. |
| 5,434,678 A | 7/1995 | Abecassis |
| 5,438,423 A | 8/1995 | Lynch |
| 5,440,334 A | 8/1995 | Walters et al. |
| 5,442,390 A | 8/1995 | Hooper et al. |
| 5,442,455 A | 8/1995 | Hioki et al. |
| 5,452,006 A | 9/1995 | Auld |
| 5,453,790 A | 9/1995 | Vermeulen et al. |
| 5,461,415 A | 10/1995 | Wolf et al. |
| 5,461,428 A | 10/1995 | Yoo |
| 5,477,263 A | 12/1995 | O'Callaghan et al. |
| 5,481,542 A | 1/1996 | Logston et al. |
| 5,508,940 A | 4/1996 | Rossmer et al. |
| 5,513,011 A | 4/1996 | Matsumoto et al. |
| 5,517,250 A | 5/1996 | Hoogenboom et al. |
| 5,521,630 A | 5/1996 | Chen et al. |
| 5,528,282 A | 6/1996 | Voeten et al. |
| 5,533,021 A | 7/1996 | Branstad et al. |
| 5,535,137 A | 7/1996 | Rossmere et al. |
| 5,535,229 A | 7/1996 | Hain, Jr. et al. |
| 5,537,408 A | 7/1996 | Branstad et al. |
| 5,541,919 A | 7/1996 | Young et al. |
| 5,550,594 A | 8/1996 | Cooper et al. |
| 5,555,463 A | 9/1996 | Staron et al. |
| 5,557,538 A | 9/1996 | Reter et al. |
| 5,557,541 A | 9/1996 | Schulhof et al. |
| 5,559,999 A | 9/1996 | Maturi et al. |
| 5,563,714 A | 10/1996 | Inoue et al. |
| 5,572,261 A | 11/1996 | Cooper |
| 5,574,662 A | 11/1996 | Windrem et al. |
| 5,581,479 A | 12/1996 | McLaughlin et al. |
| 5,583,561 A | 12/1996 | Baker et al. |
| 5,583,652 A | 12/1996 | Ware |
| 5,586,264 A | 12/1996 | Belknap et al. |
| 5,600,364 A | 2/1997 | Hendricks et al. |
| 5,603,058 A | 2/1997 | Belknap et al. |
| 5,604,544 A | 2/1997 | Bertram |
| 5,610,653 A | 3/1997 | Abecassis |
| 5,614,940 A | 3/1997 | Cobbley et al. |
| 5,619,337 A | 4/1997 | Naimpally |
| 5,625,464 A | 4/1997 | Compoint et al. |
| 5,629,732 A | 5/1997 | Moskowitz et al. |
| 5,642,171 A | 6/1997 | Baumgartner et al. |
| 5,648,824 A | 7/1997 | Dunn |
| 5,659,539 A | 8/1997 | Porter et al. |
| 5,664,044 A | 9/1997 | Ware |
| 5,668,948 A | 9/1997 | Belknap et al. |
| 5,675,388 A | 10/1997 | Cooper |
| 5,684,918 A | 11/1997 | Abecassis |
| 5,692,093 A | 11/1997 | Iggulden et al. |
| 5,696,866 A | 12/1997 | Iggulden et al. |
| 5,696,868 A | 12/1997 | Kim et al. |
| 5,696,869 A | 12/1997 | Abecassis |
| 5,701,383 A | 12/1997 | Russo et al. |
| 5,703,655 A | 12/1997 | Corey et al. |
| 5,706,388 A | 1/1998 | Isaka |
| 5,712,976 A | 1/1998 | Falcon, Jr. et al. |
| 5,715,356 A | 2/1998 | Hirayama et al. |
| 5,719,982 A | 2/1998 | Kawamura et al. |
| 5,721,815 A | 2/1998 | Ottesen et al. |
| 5,721,878 A | 2/1998 | Ottesen et al. |
| 5,724,474 A | 3/1998 | Oguro et al. |
| 5,742,730 A | 4/1998 | Couts et al. |
| 5,751,282 A | 5/1998 | Girard et al. |
| 5,751,883 A | 5/1998 | Ottesen et al. |
| 5,761,417 A | 6/1998 | Henley et al. |
| 5,774,170 A | 6/1998 | Hite et al. |
| 5,774,186 A | 6/1998 | Brodsky |
| 5,778,137 A | 7/1998 | Nielsen et al. |
| 5,805,763 A | 9/1998 | Lawler et al. |
| 5,805,821 A | 9/1998 | Saxena et al. |
| 5,808,607 A | 9/1998 | Brady et al. |
| 5,815,689 A | 9/1998 | Shaw et al. |
| 5,822,493 A | 10/1998 | Uehara et al. |
| 5,864,682 A | 1/1999 | Porter et al. |
| 5,870,553 A | 2/1999 | Shaw et al. |
| 5,889,915 A | 3/1999 | Hewton |
| 5,892,536 A | 4/1999 | Logan |
| 5,892,884 A | 4/1999 | Sugiyama et al. |
| 5,899,578 A | 5/1999 | Yanagihara et al. |
| 5,920,572 A | 7/1999 | Washington et al. |
| 5,930,444 A | 7/1999 | Camhi et al. |
| 5,930,493 A | 7/1999 | Ottesen et al. |
| 5,949,954 A | 9/1999 | Young et al. |
| 5,953,485 A | 9/1999 | Abecassis |
| 5,956,716 A | 9/1999 | Kenner et al. |
| 5,973,679 A | 10/1999 | Abbott et al. |
| 5,987,210 A | 11/1999 | Iggulden et al. |
| 5,995,709 A | 11/1999 | Tsuge |
| 5,999,688 A | 12/1999 | Iggulden et al. |
| 5,999,689 A | 12/1999 | Iggulden |
| 5,999,691 A | 12/1999 | Takagi et al. |
| 6,002,443 A | 12/1999 | Iggulden |
| 6,002,832 A | 12/1999 | Yoneda |
| 6,005,562 A | 12/1999 | Shiga et al. |
| 6,005,564 A | 12/1999 | Ahmad et al. |
| 6,005,603 A | 12/1999 | Flavin |
| 6,018,612 A | 1/2000 | Thomason et al. |
| 6,028,599 A | 2/2000 | Yuen et al. |
| 6,088,455 A | 7/2000 | Logan |
| 6,091,886 A | 7/2000 | Abecassis |
| RE36,801 E | 8/2000 | Logan et al. |
| 6,100,941 A | 8/2000 | Dimitrova et al. |
| 6,112,226 A | 8/2000 | Weaver et al. |
| 6,138,147 A | 10/2000 | Weaver et al. |
| 6,151,444 A | 11/2000 | Abecassis |
| 6,163,644 A | 12/2000 | Owashi et al. |
| 6,167,083 A | 12/2000 | Sporer et al. |
| 6,169,843 B1 | 1/2001 | Lenihan et al. |

| | | | |
|---|---|---|---|
| 6,192,189 B1 | 2/2001 | Fujinami et al. | |
| 6,198,877 B1 | 3/2001 | Kawamura et al. | |
| 6,208,804 B1 | 3/2001 | Ottesen et al. | |
| 6,208,805 B1 | 3/2001 | Abecassis | |
| 6,226,447 B1 | 5/2001 | Sasaki et al. | |
| 6,232,926 B1 | 5/2001 | Nguyen et al. | |
| 6,233,389 B1* | 5/2001 | Barton et al. | 386/46 |
| 6,243,676 B1 | 6/2001 | Whitteman | |
| 6,278,837 B1 | 8/2001 | Yasukohchi et al. | |
| 6,285,824 B1 | 9/2001 | Yanagihara et al. | |
| 6,304,714 B1 | 10/2001 | Krause et al. | |
| 6,330,675 B1 | 12/2001 | Wiser et al. | |
| 6,341,195 B1 | 1/2002 | Mankovitz et al. | |
| 6,400,407 B1 | 6/2002 | Zigmond et al. | |
| 6,404,977 B1 | 6/2002 | Iggulden | |
| 6,408,128 B1 | 6/2002 | Abecassis | |
| 6,424,791 B1 | 7/2002 | Saib | |
| 6,445,738 B1 | 9/2002 | Zdepski et al. | |
| 6,445,872 B1 | 9/2002 | Sano et al. | |
| 6,498,894 B2 | 12/2002 | Ito et al. | |
| 6,504,990 B1 | 1/2003 | Abecassis | |
| 6,529,685 B2 | 3/2003 | Ottesen et al. | |
| 6,542,695 B1 | 4/2003 | Akiba et al. | |
| 6,553,178 B2 | 4/2003 | Abecassis | |
| 6,574,594 B2 | 6/2003 | Pitman | |
| 6,597,405 B1 | 7/2003 | Iggulden | |
| 6,698,020 B1 | 2/2004 | Zigmond | |
| 6,701,355 B1 | 3/2004 | Brandt et al. | |
| 6,718,551 B1 | 4/2004 | Swix | |
| 6,771,316 B1 | 8/2004 | Iggulden | |
| 6,788,882 B1 | 9/2004 | Geer et al. | |
| 6,850,691 B1 | 2/2005 | Stam | |
| 6,856,758 B2 | 2/2005 | Iggulden | |
| 6,931,451 B1 | 8/2005 | Logan | |
| 6,978,470 B2 | 12/2005 | Swix | |
| 7,032,177 B2 | 4/2006 | Novak | |
| 7,055,166 B1 | 5/2006 | Logan | |
| 7,058,376 B2 | 6/2006 | Logan | |
| 7,072,849 B1 | 7/2006 | Filepp et al. | |
| 7,110,658 B1 | 9/2006 | Iggulden et al. | |
| 7,197,758 B1 | 3/2007 | Blackketter | |
| 7,243,362 B2 | 7/2007 | Swix | |
| 7,251,413 B2 | 7/2007 | Dow et al. | |
| 7,266,832 B2 | 9/2007 | Miller | |
| 7,269,330 B1 | 9/2007 | Iggulden | |
| 7,272,298 B1 | 9/2007 | Lang et al. | |
| 7,320,137 B1 | 1/2008 | Novak | |
| 7,430,360 B2 | 9/2008 | Abecassis | |
| 7,631,331 B2 | 12/2009 | Sie | |
| 7,634,785 B2 | 12/2009 | Smith | |
| 7,661,121 B2 | 2/2010 | Smith | |
| 7,889,964 B1 | 2/2011 | Barton | |
| 2002/0092017 A1 | 7/2002 | Klosterman | |
| 2002/0092022 A1* | 7/2002 | Dudkicwicz et al. | 725/58 |
| 2002/0120925 A1 | 8/2002 | Logan | |
| 2002/0124249 A1 | 9/2002 | Shintani | |
| 2002/0131511 A1 | 9/2002 | Zenoni | |
| 2002/0169540 A1 | 11/2002 | Engstrom | |
| 2002/0184047 A1 | 12/2002 | Plotnick | |
| 2003/0005052 A1 | 1/2003 | Feuer | |
| 2003/0031455 A1* | 2/2003 | Sagar | 386/35 |
| 2003/0031458 A1* | 2/2003 | Takahashi | 386/46 |
| 2003/0084451 A1 | 5/2003 | Pierzga | |
| 2003/0093790 A1 | 5/2003 | Logan | |
| 2003/0154128 A1 | 8/2003 | Liga | |
| 2003/0192060 A1 | 10/2003 | Levy | |
| 2003/0202773 A1 | 10/2003 | Dow et al. | |
| 2003/0231854 A1 | 12/2003 | Derrenberger | |
| 2004/0040042 A1 | 2/2004 | Feinleib | |
| 2004/0177317 A1 | 9/2004 | Bradstreet | |
| 2004/0189873 A1 | 9/2004 | Konig | |
| 2004/0190853 A1 | 9/2004 | Dow et al. | |
| 2004/0255330 A1 | 12/2004 | Logan | |
| 2004/0255334 A1 | 12/2004 | Logan | |
| 2004/0255336 A1 | 12/2004 | Logan et al. | |
| 2005/0005308 A1 | 1/2005 | Logan | |
| 2005/0025469 A1 | 2/2005 | Geer et al. | |
| 2005/0044561 A1 | 2/2005 | McDonald | |
| 2005/0132418 A1 | 6/2005 | Barton et al. | |
| 2005/0262539 A1 | 11/2005 | Barton et al. | |
| 2006/0013555 A1 | 1/2006 | Poslinski | |
| 2006/0015925 A1 | 1/2006 | Logan | |
| 2006/0218617 A1 | 9/2006 | Bradstreet et al. | |
| 2006/0280437 A1 | 12/2006 | Logan | |
| 2007/0050827 A1* | 3/2007 | Gibbon et al. | 725/88 |
| 2007/0113250 A1 | 5/2007 | Logan | |
| 2007/0124758 A1* | 5/2007 | Sung et al. | 725/22 |
| 2007/0136742 A1 | 6/2007 | Sparrell | |
| 2007/0156739 A1* | 7/2007 | Black et al. | 707/102 |
| 2007/0214473 A1* | 9/2007 | Barton et al. | 725/28 |
| 2007/0276926 A1 | 11/2007 | Lajoie | |
| 2007/0277564 A1 | 12/2007 | Jarman | |
| 2007/0300249 A1* | 12/2007 | Smith et al. | 725/19 |
| 2007/0300258 A1 | 12/2007 | O'Connor | |
| 2008/0036917 A1 | 2/2008 | Pascarella | |
| 2008/0052739 A1 | 2/2008 | Logan | |
| 2008/0112690 A1 | 5/2008 | Shahraray | |
| 2008/0155627 A1 | 6/2008 | O'Connor | |
| 2009/0304358 A1 | 12/2009 | Rashkovskiy | |

FOREIGN PATENT DOCUMENTS

| | | |
|---|---|---|
| EP | 594241 | 4/1994 |
| EP | 625858 | 11/1994 |
| EP | 645929 | 3/1995 |
| EP | 726574 | 8/1996 |
| EP | 785675 | 7/1997 |
| EP | 817483 | 1/1998 |
| EP | 1536362 | 6/2005 |
| EP | 1705908 | 9/2006 |
| GB | 2222742 | 3/1990 |
| GB | 2320637 | 6/1998 |
| JP | 06-233234 | 8/1994 |
| JP | 06-245157 | 9/1994 |
| JP | 07-111629 | 4/1995 |
| JP | 07-131754 | 5/1995 |
| JP | 07-250305 | 9/1995 |
| JP | 07-264529 | 10/1995 |
| JP | 2001 359079 | 12/2001 |
| JP | 2006 262057 | 9/2006 |
| JP | 2008 131150 | 6/2008 |
| WO | WO 92/22983 | 12/1992 |
| WO | WO 95/09509 | 4/1995 |
| WO | WO 95/32584 | 11/1995 |
| WO | WO 01/22729 | 3/2001 |

OTHER PUBLICATIONS

U.S. Appl. No. 12/130,792, filed May 30, 2008 in the name of Steven M. Casagrande.

U.S. Appl. No. 12/135,360, filed Jun. 9, 2008 in the name of Steven M. Casagrande.

U.S. Appl. No. 11/942,111.

U.S. Appl. No. 11/942,901.

"Comskip", http://www.kaashoek.com/comskip/, commercial detector.(Jan. 26, 2007).

Dimitrova, N., Jeanin, S., Nesvadba J., McGee T., Agnihotri L., and Mekenkamp G., "Real Time Commercial Detection Using MPEG Features", Philips Resiearch.

"*Paramount Pictures Corp. v. ReplayTV & SonicBlue*", http://www.eff.org/IP/Video/Paramount v. ReplayTV/20011031_complaint.html, Complaint filed, (Oct. 30, 2001).

Haughey, Matt "EFF's ReplayTV Suit Ends", http://pvrblog.com/pvr/2004/01/effs_replaytv_s.html, pvr.org, (Jan. 12, 2004).

"How to Write a New Method of Commercial Detection". MythTV. http://www.mythtv.orgi/wiki/index.php/How to Write a New Method of Commercial Detection. (Jan. 26, 2007).

Manjoo, Farhad "They Know What You're Watching", Wired News, http://www.wired.com/news/politics/0.1283.52302.00.html, Technology web page, (May 3, 2002).

MIZUTANi, Masami et al., "Commercial Detection in Heterogeneous Video Streams Using Fused Multi-Modal and Temporal Features", IEEE ICASSP, 2005, Philadelphia, (Mar. 22, 2005).

RCA, "RCA DRC8OBON DVD Recorder", http://www.pricegrabber.com/rating_getprodrev.php/product_id=12462074/id , PriceGrabber.com, (Jan. 26, 2007).

Tew. Chris "How MythTV Detects Commercials", http://www.pvrwire.com/2006/10/27/how-mythtv-detects-commercials/, (Oct. 27, 2006).

Casagrande, Steven; U.S. Appl. No. 12/434,742, filed May 4, 2009.

Casagrande, Steven; U.S. Appl. No. 12/434,746, filed May 4, 2009.

Casagrande, Steven; U.S. Appl. No. 12/434,751, filed May 4, 2009.

ISR for PCT/US2009/037183 mailed Jul. 15, 2009.

Casagrande, Steven; U.S. Appl. No. 12/486,641, filed Jun. 17, 2009.

International Search Report for PCT/US2009/069019 mailed on Apr. 14, 2010.

International Search Report for PCT/US2010/038836 mailed on Oct. 1, 2010.

OA mailed on Oct. 27, 2010 for U.S. Appl. No. 12/130,792, filed May 30, 2008 in the name of Casagrande.

OA mailed on Nov. 29, 2010 for U.S. Appl. No. 12/135,360, filed Jun. 9, 2008 in the name of Casagrande.

Final Office Action mailed on Apr. 14, 2011 for U.S. Appl. No. 12/130,792, filed May 30, 2008 in the name of Casagrande.

Final Office Action mailed on Apr. 27, 2011 for U.S. Appl. No. 12/135,360, filed Jun. 9, 2008 in the name of Casagrande.

Office Action mailed on Jun. 7, 2011 for U.S. Appl. No. 11/942,901, filed Nov. 20, 2007 in the name of Casagrande.

Invitation to Pay Fees and Partial Search Report for PCT/EP2011/051335 mailed May 16, 2011.

Office Action mailed on Jun. 2, 2011 for U.S. Appl. No. 11/942,111, filed Nov. 19, 2007 in the name of Casagrande.

Satterwhite, "Autodetection of TV Commercials" 2004.

Notice of Allowance mailed on Sep. 27, 2011 for U.S. Appl. No. 11/942,901 in the name of Casagrande.

Notice of Allowability, Interview Summary and Examiner's Amendment mailed on Oct. 14, 2011 for U.S. Appl. No. 11/942,111 in the name of Casagrande.

Office action mailed on Jul. 1, 2011 for U.S. Appl. No. 12/130,792 in he name of Casagrande.

Office action response filed Aug. 15, 2011 for U.S. Appl. No. 12/138,350 filed in the name of Casagrande, et al.

Office action response filed Jun. 13, 2011 for U.S. Appl. No. 12/130,792 in in the name of Casagrande.

Office action for U.S. Appl. No. 12/130,792 in the name of Casagrande.

Office action response filed Sep. 2, 2011 for U.S. Appl. No. 11/942,111 in the name of Casagrande.

Office action response filed Sep. 7, 2011 for U.S. Appl. No. 11/942,901 in the name of Casagrande.

Office Action mailed on Jun. 27, 2011 for Canadian Application 2,665,855.

* cited by examiner

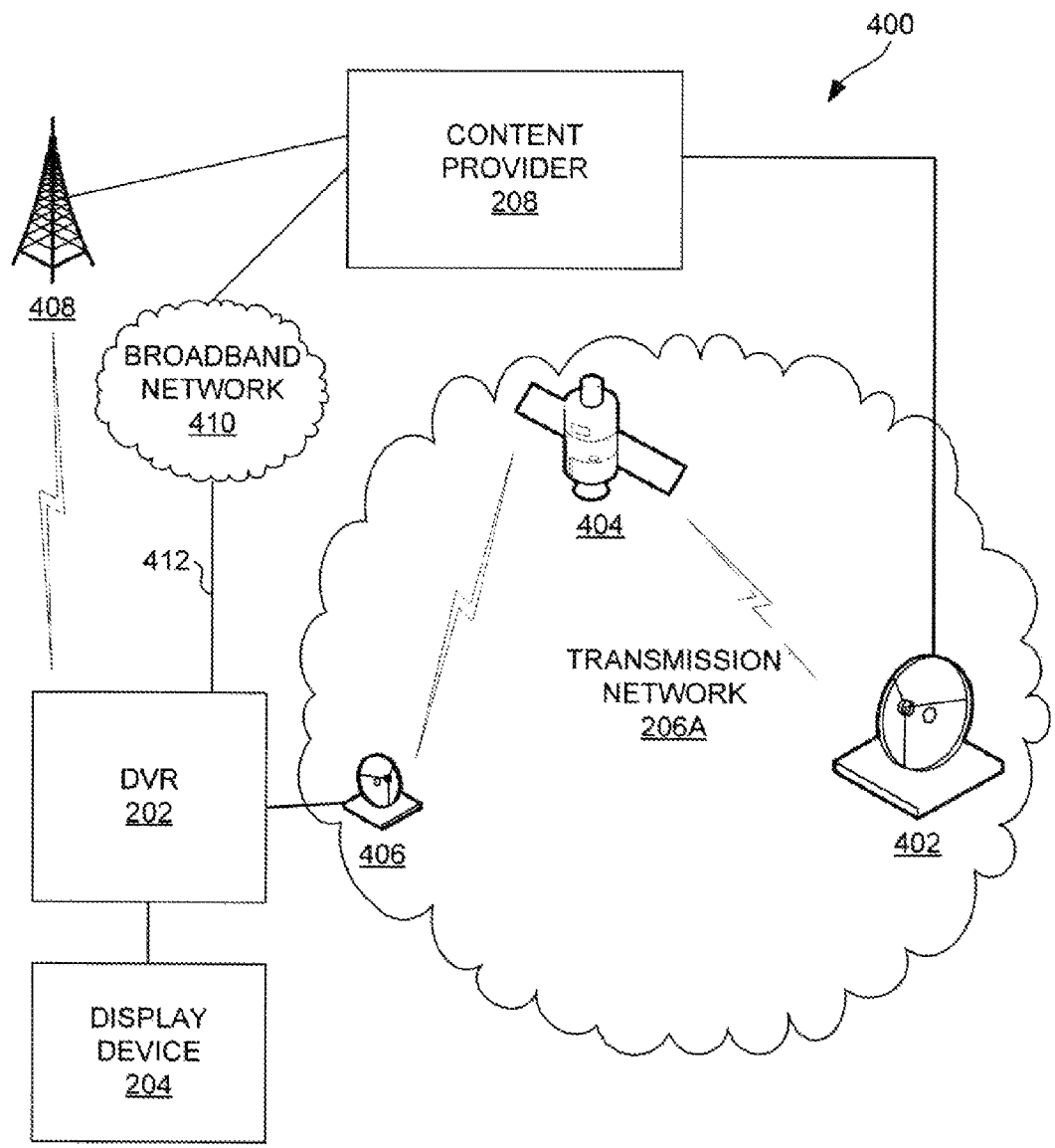
FIG. 4

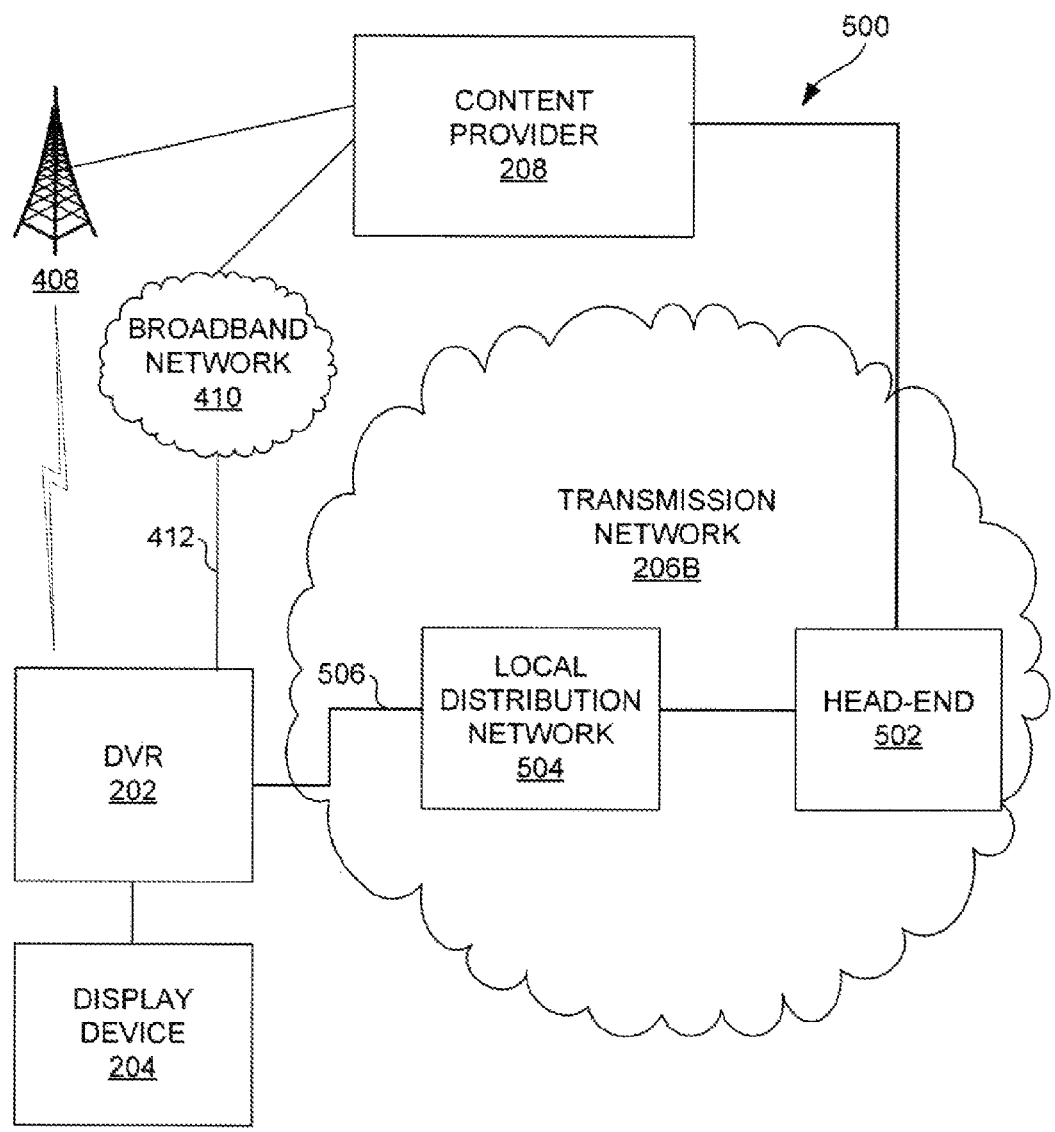
FIG. 5

```
<DishAnnouncement>
    <action>add</action>
    <uid>cz20070226203947</uid>
    <startTime>20070227040000</startTime>
    <endTime>20070227130000</endTime>
    <Package>
        <name>Show Metadata for 'Seinfeld</name>
        <type>0x08</type>      <!-- Show Metadata -->
        <expirationTime>20070227210000</expirationTime>
        <descriptor>
        <!-- program_unique_id_descriptor( ) (syntax 2) -->
            </descriptor>
        <descriptor>
        <!-- segment_descriptor( ) -->
            <tag>0xC1</tag>
            <u8>1</u8>                        <!-- segment_number (1 of 3) -->
            <u8>3</u8>                        <!-- last_segment_number (3) -->
            <u8>20</u8>                       <!-- closed caption string length -->
            <u8>cc_char</u8>                  <!-- close captioning anchor string -->
            ...
            <u8></u8>                         <!-- an even number of <u8>'s -->
            <u32>300300</u32>                 <!-- start_offset -->
            <u32>37800000</u32>               <!-- end_offset -->
        </descriptor>
        <descriptor>
        <!-- segment_descriptor( ) -->
            <tag>0xC1</tag>
            <u8>2</u8>                        <!-- segment_number (2 of 3) -->
            <u8>3</u8>                        <!-- last_segment_number (3) -->
            <u8>12</u8>                       <!-- closed caption string length -->
            ...
            <u8>cc_char</u8>                  <!-- an even number of <u8>'s -->
            <u32>225225</u32>                 <!-- start_offset -->
            <u32>50400000</u32>               <!-- end_offset -->
        </descriptor>
        <descriptor>
        <!-- segment_descriptor( ) -->
            <tag>0xC1</tag>
            <u8>3</u8>                        <!-- segment_number (3 of 3) -->
            <u8>3</u8>                        <!-- last_segment_number (3) -->
            <u8>2</u8>                        <!-- closed caption string length -->
            ...
            <u8>cc_char</u8>                  <!-- an even number of <u8>'s -->
            <u32>900000</u32>                 <!-- start_offset -->
            <u32>38070000</u32>               <!-- end_offset -->
        </descriptor>
    </Package>
</DishAnnouncement>
```

*FIG. 9*

METHODS AND APPARATUS FOR GENERATING METADATA UTILIZED TO FILTER CONTENT FROM A VIDEO STREAM USING TEXT DATA

BACKGROUND

Digital video recorders (DVRs) and personal video recorders (PVRs) allow viewers to record video in a digital format to a disk drive or other type of storage medium for later playback. DVRs are often incorporated into set-top boxes for satellite and cable television services. A television program stored on a set-top box allows a viewer to perform time shifting functions, and may additionally allow a viewer to skip over commercial breaks and other portions of the recording that the viewer does not desire to watch. However, the user performs this function manually, for example, using a fast forward button of a remote control associated with the DVR. This manual fast forwarding is an inconvenience for the user. Further, manual fast forwarding by a user often leads to inaccurate results, because the user may fast forward past portions of the recording they desire to watch, or may resume playback during the portion of the recording that they want to skip over.

BRIEF DESCRIPTION OF THE DRAWINGS

The same number represents the same element or same type of element in all drawings.

FIG. 4 illustrates an embodiment of a satellite broadcast system.

FIG. 5 illustrates an embodiment of a cable television distribution system.

FIG. 9 illustrates an example of a metadata stream transmitted to a DVR.

DETAILED DESCRIPTION

The various embodiments described herein generally provide apparatus, systems and methods which facilitate the generation of metadata utilized by a DVR to filter content from an audio/video (A/V) stream. In short, various embodiments described herein provide apparatus, system and/or methods for identifying text data associated with video data in an A/V stream that may be utilized to identify portions of the A/V stream that are to be skipped during presentation of the A/V stream by a DVR or other type of recording device.

In at least one embodiment, the A/V stream to be received, processed, outputted and/or communicated may come in any form of a video stream. It is to be appreciated that the video stream may be supplied by any source, such as an over-the-air broadcast, a satellite or cable television distribution system, a digital video disk (DVD) or other optical disk, the internet or other communication networks, and the like. In at least one embodiment, the video stream may include text data, such as closed captioning data or subtitles, that is included in the video stream or associated with the video stream. Thus, in at least one embodiment, the video stream may comprise video data, audio data and text data.

In various embodiments described herein, portions of the video stream that are to be skipped during presentation by a DVR are identified, and the video frames at the boundaries and/or transitions of these portions of the video stream are determined. In at least one embodiment, the boundaries of the identified portions of the video stream may be indexed for utilization during presentation of the video stream. The portions of the video stream between indexed boundaries may then be designated for presentation to a user, or may be designated for skipping during presentation of the video stream. Thus, in at least one embodiment, portions of a video stream that a user desires to view may be presented to the user, and portions of the video stream that a user desires not to view may be skipped during presentation of the video stream. The text data corresponding with a video stream is processed to determine strings in the text data that may be utilized to identify portions of the video stream that are to be presented and/or skipped during presentation of the video stream by a DVR. The strings and/or other information are provided to the DVR, and the DVR utilizes the received information to process the video stream and skip certain portions of the video stream.

Figure 1:
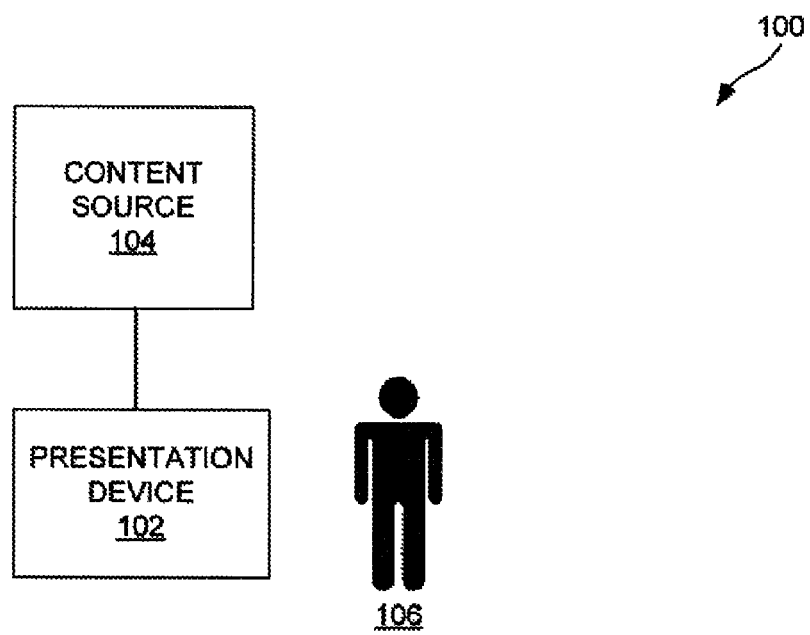
FIG. 1 illustrates an embodiment of an entertainment system.

FIG. 1 illustrates an embodiment of an entertainment system 100. The entertainment system 100 presents content to a user 106. In at least one embodiment, the content presented to the user 106 includes a video stream, such as a television program, movie or other recorded content and the like. The entertainment system 100 includes a presentation device 102 and a content source 104. Each of these components is discussed in greater detail below.

The presentation device 102 is configured to receive content from one or more content sources 104, and to present the received content to the user 106. In at least one embodiment, the presentation device 102 is a display device configured to display content to the user 106. In other embodiments, the presentation device 102 is a set-top box (e.g., a satellite or cable television converter box), digital video recorder (DVR) or other similar device that processes and provides one or more audio and/or video streams to a display device for presentation to a user. It is to be appreciated that the presentation device 102 may also be embodied as an apparatus combining the functionality of a display device and a set-top box, DVR or the like.

The presentation device 102 may receive a video stream in any format (e.g., analog or digital format), and present the video stream to the user 106. In at least one embodiment, the presentation device 102 may filter a received video stream to skip portions of the video stream. More particularly, in at least one embodiment, the presentation device 102 may filter a video stream by identifying data in the video stream or associated with the video stream that may be correlated with boundaries for portions of the video stream. For example, the presentation device 102 may parse the text data (e.g., the closed captioning data or subtitles) for a video stream to identify the boundaries for various portions of the video stream. In at least one embodiment, the presentation device 102 may receive metadata including instructions for parsing the text data to identify the boundaries in the video stream. The identified boundaries may then be utilized for determining which portions of the video stream will be presented to the user 106.

The content source 104 may comprise any system or apparatus configured to provide presentation data, such as a video stream, to the presentation device 102. The content source 104 may be external or internal to the presentation device 102. The presentation device 102 and the content source 104 may be communicatively coupled through any type of wired or wireless connection, communication network and the like. Exemplary content sources include television distribution systems (e.g., over the air distribution systems, cable television distribution systems, satellite television distribution systems and broadband distribution systems), DVD players and other optical disk players, digital storage mediums (e.g., DVRs) and the internet The video stream provided by the content source 104 may include text data, such as subtitles or closed captioning data. The text data may be embedded in the video stream (e.g., in vertical blanking interval line 21 or user data) or may be provided in a separate data stream. In at least one embodiment, the content source 104 may further provide metadata to the presentation device 102 that is utilized for filtering of the video stream. The metadata is discussed in greater detail below. Thus, through the operation of the entertainment system 100, the user 106 is presented with a filtered version of a video stream. Entertainment system 100 may include other elements or components not illustrated for the sake of brevity.

Figure 2:
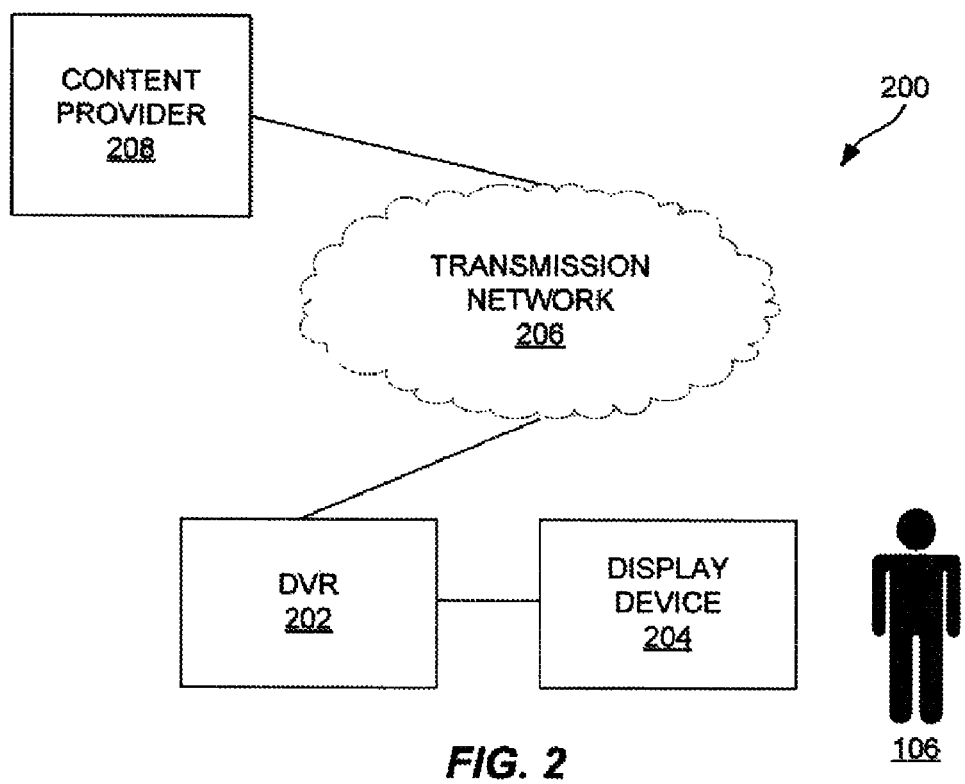
FIG. 2 illustrates an embodiment of a content distribution system.

FIG. 2 illustrates an embodiment of a content distribution system 200. The content distribution system 200 is configured to present a filtered video stream to a user 106. The content distribution system 200 includes a DVR 202, a display device 204, a transmission network 206 and a content provider 208. Each of these components is discussed in greater detail below.

The display device 204 may comprise any type of device operable for receiving and displaying analog and/or digital video signals. In at least one embodiment, the display device 204 may be a television set or video display that contains an integrated television converter device (e.g., an internal cable-ready television tuner housed inside a television), or, alternatively, that is connected to an external television converter device for receiving and demodulating analog and/or digital signals for presentation on the display device 204 (e.g., a set-top box).

Using an integrated television converter device, the display device 204 may be operable to communicate directly with the transmission network 206. For example, the transmission network 206 may comprise an over-the-air distribution system (e.g., free television), and the display device 204 may receive television broadcast signals using an internal or external antenna. The transmission network 206 may also comprise a cable television distribution system, and the display device 204 may comprise a cable ready television adapted to receive and demodulate analog or digital cable television signals for presentation to the user 106. A direct broadcast satellite or other type of wired or wireless communications network may also be used solely or in conjunction with the foregoing. In at least one embodiment, the display device 204 may communicate with the transmission network 206 through an intermediate device, such as a set-top box.

The DVR 202 is communicatively coupled to the display device 204 through any type of wired or wireless connection. Exemplary wired connections include coax, fiber, composite video and high-definition multimedia interface (HDMI). Exemplary wireless connections include WiFi and Bluetooth. In at least one embodiment, the DVR 202 may be embodied in a television converter device (e.g., a satellite television receiver). The DVR 202 may also be incorporated into the display device 204.

The DVR 202 captures and records video content from attached devices onto a storage medium for subsequent presentation to the user 106. As illustrated in FIG. 2, the DVR 202 is coupled to a content provider 208 (e.g., a satellite television provider) through the transmission network 206. Thus, the DVR 202 receives a television signal (e.g., a broadcast) or other data signal (e.g., digital video data or other data formatted into a video stream) from the transmission network 206, and records television programs and other content provided by the content provider 208. The DVR 202 may perform processing functions to parse text data associated with or embedded in the video stream in order to filter portions of the video stream for presentation on the display device 204. It is to be appreciated that the DVR 202 may capture and record video streams from other non-broadcast services, such as video recorders, DVD players, personal computers or the internet.

The DVR 202 may include a remote control or other input device (not shown) that the user 106 may utilize for remotely operating the DVR 202 and/or the display device 204. More specifically, a remote control may be operable for controlling the presentation of video and/or other data presented by the DVR 202 on the display device 204.

The content provider 208 comprises any source or sources of television or other video signals. In at least one embodiment, the content provider 208 provides a television broadcast signal to the DVR 202 over the transmission network 206. The content provider 208 may provide closed captioning data with the television broadcast signal. The content provider 208 may be a television station that generates and provides the content or may be a television service that provides retransmission of television signals (e.g., a satellite television provider). It is to be appreciated that the content provider 208 may also provide some retransmission services while generating and providing some original or derivative content.

The transmission network 206 may comprise any type of communication network utilized between the DVR 202 and the content provider 208. Exemplary communication networks include television distribution networks (e.g., over the air, satellite and cable television networks), wireless communication networks, public switched telephone networks (PSTN), and local area networks (LAN) or wide area networks (WAN) providing data communication services. The transmission network 206 may utilize any desired combination of wired (e.g., cable and fiber) and/or wireless (e.g., cellular, satellite, microwave, and radio frequency) communication mediums and any desired network topology (or topologies when multiple mediums are utilized). The DVR 202 may communicate with the transmission network 206 through a wired or wireless connection. The transmission network 206 may distribute television broadcast and other data signals in digital or analog form. Exemplary video formats include moving picture experts group (MPEG), flash, Windows Media, and the like. Content distribution system 200 may include other elements or components not illustrated for the sake of brevity.

Figure 3:
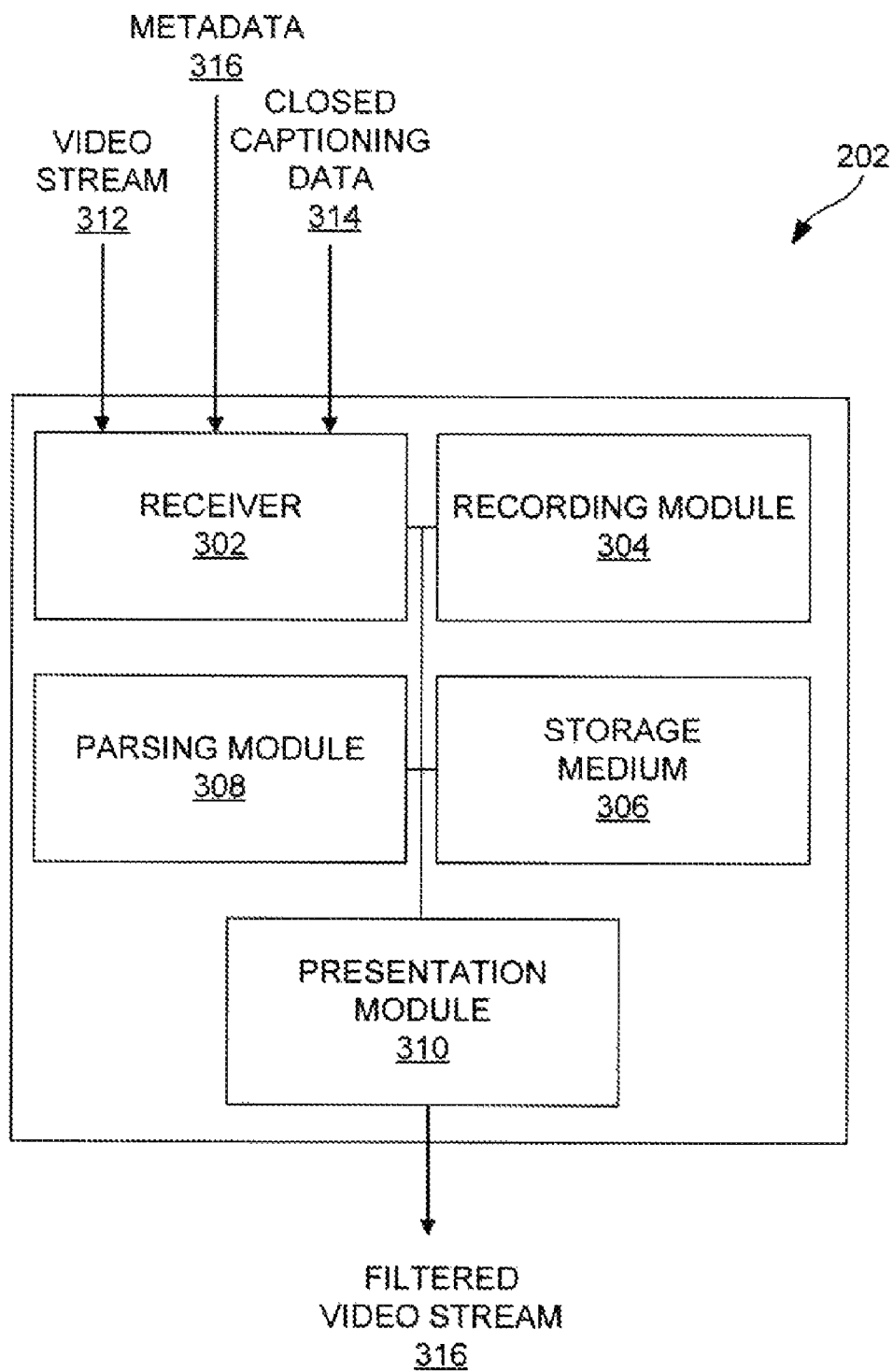
FIG. 3 illustrates an embodiment of functional components of the DVR of FIG. 2.

FIG. 3 illustrates an embodiment of functional components of the DVR 202 of FIG. 2. FIG. 3 will be discussed in reference to the content distribution system 200 illustrated in FIG. 2. The DVR 202 comprises a receiver 302, a recording module 304, a storage medium 306, a parsing module 308 and a presentation module 310. Each of these components is discussed in greater detail below.

The receiver 302 receives a video stream 312 and closed captioning data 314 from the transmission network 206 (see FIG. 2). The receiver 302 may comprise a wired or wireless receiver. In at least one embodiment, the closed captioning data 314 is embedded within the video stream 312. The receiver 302 may further receive other data from the transmission network 206, such as metadata 316 instructing the DVR 202 how to parse the closed captioning data 314 to determine boundaries within the video stream 312.

The recording module 304 receives the video stream 312 and the closed captioning data 314, and stores the video stream 312 and the closed captioning data 314 on the storage medium 306. The storage medium 306 may be any type of temporary or persistent storage device capable of storing the video stream 312 and the closed captioning data 314. The storage medium 306 may be internal and/or external to the DVR 202 and may include one or more storage devices. For example, the storage medium 306 may be an internal hard drive or flash memory. The video stream 312 and the closed captioning data 314 may be stored together and/or separately on the storage medium 306.

The parsing module 308 is configured to index the closed captioning data 314 according to a presentation order. In at least one embodiment, the parsing module 308 indexes the closed captioning data 314 during the recording process. In some embodiments, the parsing module 308 may index the closed captioning data 314 subsequent to recording. For example, the parsing module 308 may index the closed captioning data 314 upon receiving a playback instruction from the user 106 (see FIG. 2). The parsing module 308 is further configured to parse the closed captioning data 314 to identify portions of the video stream to skip and/or present during presentation of the video stream 312 using the metadata 316 sent to the DVR 202.

The presentation module 310 is configured to present recorded video streams to the user 106 (see FIG. 2). The presentation module 310 retrieves the video stream 312 and/or the closed captioning data 314 from the storage medium 306, and presents the content of the video stream 312 to the user 106 (see FIG. 2). In at least one embodiment, the presentation module 310 receives information from the parsing module 308 identifying portions of the video stream 312 that are to be skipped and/or shown during presentation. The presentation module 310 filters the video stream 312 to skip portions that are designated for skipping, and presents the filtered video stream 318 to the user 106 (see FIG. 2). In at least one embodiment, the presentation module 310 may remove portions of the video stream 312 that are designated for skipping. If applicable, the presentation module 310 also presents the closed captioning data 314 corresponding to the portions of the filtered video stream 318 that are presented to the user 106.

Those of ordinary skill in the art will appreciate that the various functional elements 302 through 310 shown as operable within the DVR 202 may be combined into fewer discrete elements or may be broken up into a larger number of discrete functional elements as a matter of design choice. For example, the parsing module 308, the recording module 304 and/or the presentation module 310 may be combined into a single processing module. Thus, the particular functional decomposition suggested by FIG. 3 is intended merely as exemplary of one possible functional decomposition of elements within the DVR 202.

FIG. 4 illustrates an embodiment of a satellite broadcast system 400. More particularly, FIG. 4 illustrates details of a transmission network 206A. Satellite broadcast system 400 will be discussed in reference to content distribution system 200 illustrated FIGS. 2-3.

Satellite broadcast system 400 includes a content provider 208 in signal communication with an uplink system 402 of a transmission network 206A. The content provider 208 provides the uplink system 402 with television programs that are transmitted to a DVR 202. Television programs may be broadcast by the transmission network 206A, or may be pushed to the DVR 202 responsive to a request by the user 106. The television program may be embodied as MPEG-2, MPEG-4 or other digital video signals, analog or baseband signals, and/or other video data on a channel of the satellite broadcast system 400.

Satellite broadcast system 400 further comprises a satellite 404 in signal communication with the uplink system 402. The satellite 404 broadcasts television programs received from the uplink system 402. The satellite broadcast system 400 further comprises a satellite antenna 406 for receiving the television program broadcast from the satellite 404. The satellite antenna 406 is in signal communication with the DVR 202, and provides the DVR 202 with the television program. The broadcast television program content is received and stored on the DVR 202, and may be presented on the display device 204 responsive to the user 106 selecting to view the recorded television program. The transmission network 206A may also be configured to transmit metadata and other data to the DVR 202. The metadata may be utilized by the DVR 202 to process the television programming and filter out portions of the television programming.

In at least one embodiment, the DVR 202 may be configured to receive over-the-air television programming from a transmitter 408 using a built in receiver/tuner. For example, the DVR 202 may receive local programming over-the-air, and may receive national programming from the transmission network 206A. In at least one embodiment, the DVR 202 may receive the metadata from the transmitter 408. In some embodiments, the DVR 202 may receive the metadata for the over-the-air programming from the content provider 208 through the transmission network 206A.

As illustrated in FIG. 4, the DVR 202 may optionally be communicatively coupled to the content provider 208 through a broadband network 410 using a broadband connection 412. The broadband connection 412 may be utilized to deliver metadata and/or video programming to the DVR 202. It is to be appreciated that any combination of the described communication paths may be utilized to transmit video programming and/or metadata between the content provider 208 and the DVR 202. For example, the DVR 202 may receive video programming through the transmission network 206A, and may request metadata associated with the video programming from the content provider 208 using the broadband network 410. It is also to be appreciated that the metadata and the video programming may be provided by difference sources (e.g., two different content providers 208).

Transmission network 206 (see FIG. 2) may also be embodied in a cable television distribution system. FIG. 5 illustrates an embodiment of a cable television distribution system 500. More particularly, FIG. 5 illustrates details of a transmission network 206B. Cable television distribution system 500 will be discussed in reference to content distribution system 200 illustrated in FIGS. 2-3.

Cable television distribution system 500 comprises a head-end 502 in signal communication with a content provider 208. The content provider 208 provides the head-end 502 with television programs that are transmitted to the display device 204. Television programs may be broadcast by transmission network 206B, or may be pushed to the DVR 202 responsive to a request by the user 106. Television programs may also be pushed to the DVR 202 using a broadband connection 412 through the broadband network 410.

Cable television distribution system 500 further comprises a local distribution network 504 in signal communication with the head-end 502. The local distribution network 504 is operable for receiving content from the head-end 502 and distributing the content to individual display devices 204. The DVR 202 is in signal communication with the local distribution network 504 using a drop 506 from a feeder line of the local distribution network 504. The local distribution network 504 may provide content as a broadcast to the DVR 202, or may provide content to a specific addressable DVR 202 using the broadband connection 412. In at least one embodiment, the broadband network 410 may be integrated within the transmission network 206B.

Figure 6:
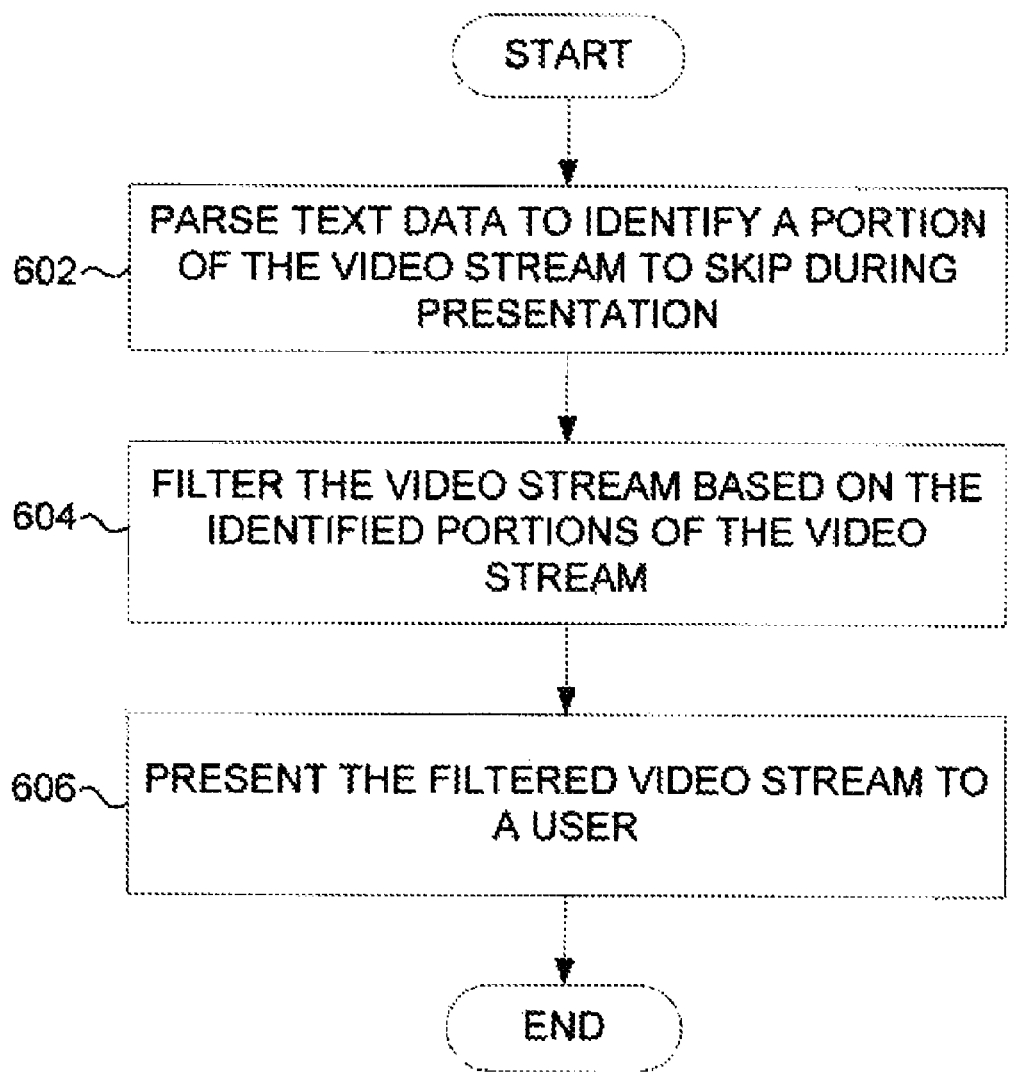
FIG. 6 illustrates an embodiment of a process for filtering a video stream based on text data.

FIG. 6 illustrates an embodiment of a process for filtering a video stream based on text data. The operation of FIG. 6 is discussed in reference to filtering a broadcast television program. However, it is to be appreciated that the operation of the process of FIG. 6 may be applied to filter other types of video stream content, such as DVD videos. The operations of the process of FIG. 6 are not all-inclusive, and may comprise other operations not illustrated for the sake of brevity.

The process includes parsing text data associated with a video stream using the metadata to identify portions of the video stream to skip during presentation of the video stream (operation 602). Operation 602 may be performed to skip portions of a video stream for a variety of reasons. For example, a user may desire to skip commercials, portions of a television program or other content which is of no interest to the user, or portions of the video stream which are offensive or should otherwise not be shown to certain users. In at least one embodiment, operation 602 includes parsing the text data in the video stream that is displayable to a user.

In at least one embodiment, a video stream may include a recording of a contiguous block of programming from a television channel (e.g., an episode of a television show). For example, a DVR may record a single channel between 7:00 and 8:00, which may correspond with a single episode of a television program. An hour long recording may include approximately 42 minutes of video frames of the television program, and approximately 18 minutes of video frames of commercials and other content that is not part of the television program.

The television program may be comprised of multiple segments of video frames, which are interspersed with interstitials (e.g., commercials). As used herein, an interstitial is the video frames of a recording that do not belong to a selected show (e.g., commercials, promotions, alerts, and other shows). A segment of video includes contiguous video frames of the program that are between one or more interstitials.

Illustrated in the table below is one exemplary breakdown of the segments and interstitials within a recording of a one hour television program. For example, the recording may include six segments of the program, each including 7 minutes of video frames. Between each pair of segments is 3 minutes of interstitials. The beginning and ending of the recording includes 1.5 minutes of interstitials.

TABLE #1

Exemplary one hour television recording

| Portion of the recording | Duration (mins) |
|---|---|
| Interstitial #1 | 1.5 |
| Segment #1 | 7 |
| Interstitial #2 | 3 |
| Segment #2 | 7 |
| Interstitial #3 | 3 |
| Segment #3 | 7 |
| Interstitial #4 | 3 |
| Segment #4 | 7 |
| Interstitial #5 | 3 |
| Segment #5 | 7 |
| Interstitial #6 | 3 |
| Segment #6 | 7 |
| Interstitial #7 | 1.5 |
| Total duration | 60 |

A string included within the text data may be utilized to identify specific locations within the video stream. The marked location may be located within a portion of the video stream that is designated for presentation (e.g., part of a television program), or may be within a portion of the video stream that is designated for skipping (e.g., in a portion of the program that a user does not desire to view).

For example, a string may identify a location within segment #1. Once the location is identified within segment #1, the boundaries of segment #1 may be determined. In at least one embodiment, the boundaries of segment #1 are identified using offsets relative to the identified location of a string. For example, if the identified location of the string in segment #1 is 6 minutes into the one hour recording, then an offset of 4.5 minutes prior to the location of the string describes the beginning of segment #1. Likewise, an offset of 2.5 minutes after the location of the string describes the ending of segment #1. A similar process may be utilized with additional strings and offsets to locate the boundaries of the other segments of the video streams. In at least one embodiment, multiple anchor frames, each having different starting and ending offset times, may be utilized within one segment for redundancy.

Thus, the parsing process identifies portions of the video stream that are to be skipped during presentation to a user. In the example illustrated in table #1, operation 602 identifies interstitials #1-7 for skipping during presentation of the video stream. It is to be appreciated that other techniques may also be utilized to determine the boundaries of a segment once a location is identified by the parsing process. For example, a first string may be utilized to identify the location of the beginning boundary of the segment, and a second string may be utilized to identify the location of the ending boundary of the string.

Once the parsing process is complete, portions of the video stream may be filtered prior to presentation. The process further includes filtering the video stream based on the identified portions of the video stream (operation 604) to generate a filtered video stream. The process further includes presenting the filtered video stream to a user (operation 606).

As described above, interstitials #1-7 are designated for skipping during the presentation of the video stream. Thus, segments #1-6 will be presented to the user without the interstitials presented between each segment. The presentation of the television program will start at the beginning of segment #1 (1.5 minutes into the recording), skipping the video frames of interstitial #1. After the ending of segment #1, the presentation will continue at the beginning of segment #2. Therefore, the television user doesn't see the video frames of interstitial #2. In at least one embodiment, an indicator, such as a small icon displayed in a corner of the screen, may be presented to a user to indicate that a portion of the video stream was skipped during the presentation.

Figure 7:
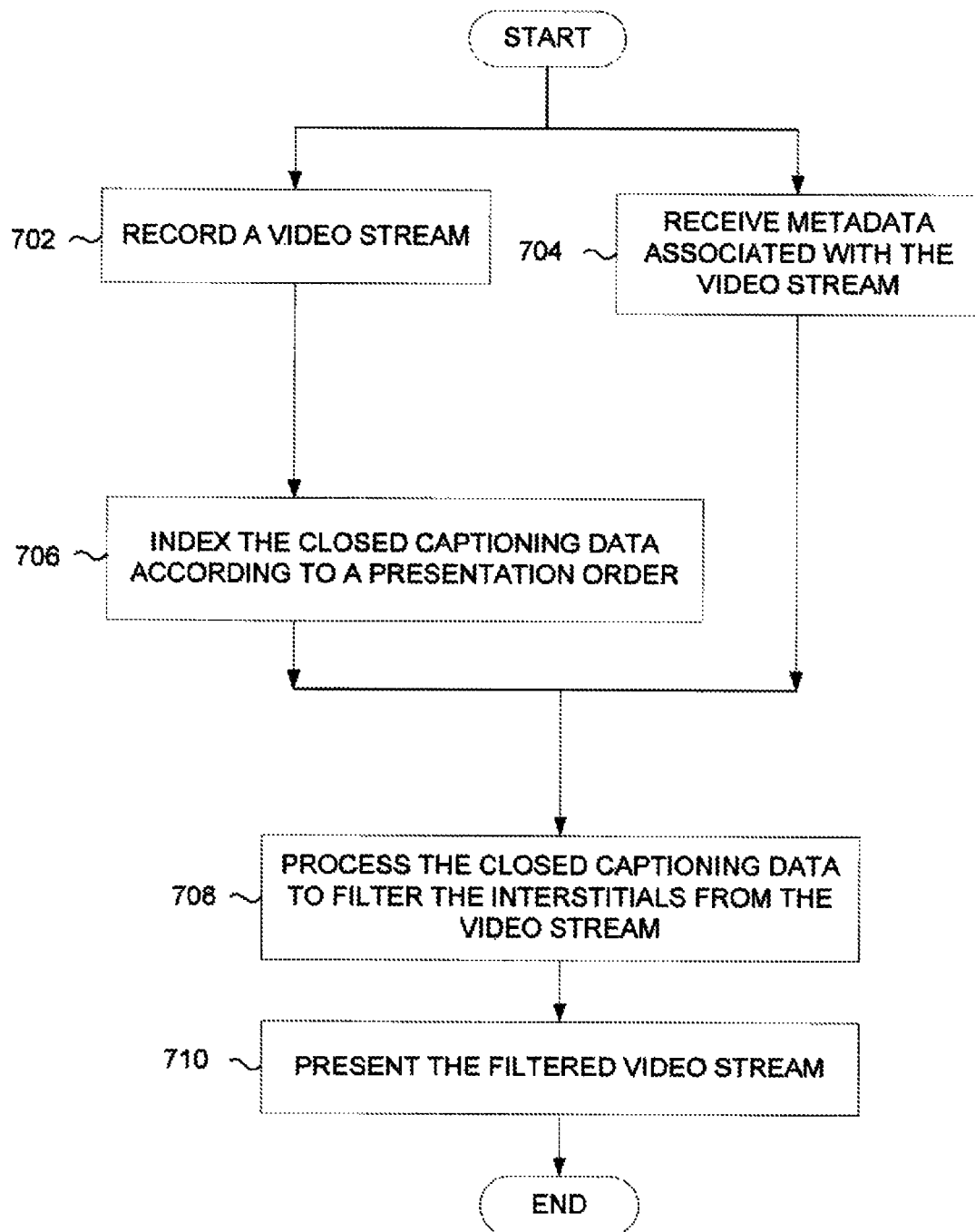
FIG. 7 illustrates an embodiment of a process for filtering interstitials from a video stream based on text data.

FIG. 7 illustrates an embodiment of a process for filtering interstitials from a video stream based on text data. The operation of FIG. 7 is discussed in reference to filtering a broadcast television program. However, it is to be appreciated that the operation of the process of FIG. 7 may be applied to filter other types of video stream content. The operations of the process of FIG. 7 are not all-inclusive, and may comprise other operations not illustrated for the sake of brevity.

The process includes recording a video stream including at least one segment of a show, at least one interstitial of the show, and closed captioning data associated with the segments of the show (operation 702).

The process further includes receiving metadata associated with the video stream that identifies the boundaries of the segments of the show (operation 704). In at least one embodiment, for each segment of the show, the metadata includes a string located within the segment, and a beginning and an ending offset from the string that identifies the boundaries of the segment. Offsets are utilized, because the actual presentation times of the beginning and ending boundaries of the segment may change due to many factors, which are discussed in greater detail below. Operations 702 and 704 may be performed in parallel, or sequentially in either order. For example, the metadata may be received prior to recording the video stream, subsequently to recording the video stream, or at the same time as the video stream.

The process further includes indexing the closed captioning data according to a presentation order (operation 706). Closed captioning data is typically transmitted in two or four byte intervals associated with particular video frames. Because video frames don't always arrive in their presentation order, the closed captioning data is sorted according to the presentation order (e.g., by a presentation time stamp) of the closed captioning data. In at least one embodiment, the indexing process may be performed responsive to receiving the metadata in step 704. Thus, a DVR may not perform the indexing process unless the metadata used to filter the video stream is available for processing. In other embodiments, the closed captioning data may be indexed before the metadata arrives at the DVR. For example, the indexing may be performed in real-time during recording. In at least one embodiment, the sorted closed captioning data is stored in a file and associated with the recorded video stream.

The process further includes processing the closed captioning data, to filter the interstitials from the recorded video stream, based on the metadata, to generate a filtered video stream (operation 708). It is to be appreciated that operation 708 may identify either the boundaries of the segments of the interstitials or the segments of the show to filter the interstitials from the video stream.

In at least one embodiment, operation 708 may include creating segment bookmarks that mark the start and end of a segment. A segment bookmark is a structure created by the recording software. A start segment bookmark points to the start of the segment, and an end segment bookmark points to the end of a segment. The metadata for a segment includes information that specifies the boundaries of one segment. More specifically, in at least one embodiment, the metadata includes a string (which may be unique within the closed captioning data of the recording, or unique within the segments of the show), that is associated with an anchor frame. As used herein, an anchor frame refers to a video frame that contains selected bytes of a closed captioning string. In at least one embodiment, the anchor frame contains the last bytes of the closed captioning string. It is to be appreciated that the anchor frame may be a show frame within the segment, or may be a skip frame within the segment.

By locating the anchor frame, the beginning bookmark may be created based on the anchor frame and the beginning offset. Likewise, the ending bookmark may be created based on the anchor frame and the ending offset. The video frames between a beginning bookmark and an ending bookmark may define the portions of the video stream that are presented to a user.

The process further includes presenting the filtered video stream to a user (operation 710). If segment bookmarks are created, the presentation process includes presenting the segment of the video stream between the beginning bookmark and the ending bookmark. Because the interstitial portions of the video stream are not included within the bookmarks for a segment, they are excluded from presentation to the user.

As described above, the actual presentation times of each segment of a television program within different recordings may vary. For example, two users may not begin recording a program at the same exact points in a broadcast. Thus, there may be a difference in the video frames contained within the recording made by each viewer. Also, many nationally televised shows are broadcast by affiliates of a broadcast network. The broadcast network may have different affiliates in each television market around the country. Each affiliate has some discretion in the location of the interstitials of the television program, and is allowed to insert some of their own content (e.g., local commercials) into various portions of the time slot of the television program. For example, an affiliate may make one of the commercial breaks longer than commercial breaks of other affiliates to accommodate a longer portion of local content, and likewise may make another commercial break shorter in order to offset the difference. Thus, when a television program is recorded in Denver, the recording may not be the same as a television program recorded in New York City.

Table #2 illustrates two exemplary break downs of interstitial and segment durations for two different affiliates transmitting the same television program in two different markets. The duration of each segment doesn't change, but the duration (and content) of each interstitial is different for the two affiliates. Table #3 illustrates exemplary segment and interstitial starting and ending times for each affiliate illustrated in FIG. 2. For example, viewers in NYC and Denver may begin watching or recording a program at 7:00 in their respective time zones. The viewer in NYC will see the beginning of the first segment of the program at 1.5 minutes into the recording, while the viewer in Denver will see the beginning of the first segment of the program at 1 minute into the recording. Regardless of the starting time of the segment, both viewers will see the same content of the segment for the seven minutes following the start of the segment.

TABLE #2

Exemplary one hour recording of a television program for two affiliates.

| Portion of program | Duration (NYC) | Duration (Denver) |
| --- | --- | --- |
| Interstitial #1 | 1.5 | 1 |
| Segment #1 | 7 | 7 |
| Interstitial #2 | 3 | 3 |
| Segment #2 | 7 | 7 |
| Interstitial #3 | 3 | 4 |
| Segment #3 | 7 | 7 |

TABLE #2-continued

Exemplary one hour recording of a television program for two affiliates.

| Portion of program | Duration (NYC) | Duration (Denver) |
|---|---|---|
| Interstitial #4 | 3 | 3 |
| Segment #4 | 7 | 7 |
| Interstitial #5 | 3 | 2.5 |
| Segment #5 | 7 | 7 |
| Interstitial #6 | 3 | 4 |
| Segment #6 | 7 | 7 |
| Interstitial #7 | 1.5 | 0.5 |
| Total duration | 60 | 60 |

TABLE #3

Exemplary segment and interstitial starting and ending times for a recording from each affiliate.

| Portion of program | Start NYC | End NYC | Start Denver | End Denver |
|---|---|---|---|---|
| Interstitial #1 | 0 | 1.5 | 0 | 1 |
| Segment #1 | 1.5 | 8.5 | 1 | 8 |
| Interstitial #2 | 8.5 | 11.5 | 8 | 11 |
| Segment #2 | 11.5 | 18.5 | 11 | 18 |
| Interstitial #3 | 18.5 | 21.5 | 18 | 22 |
| Segment #3 | 21.5 | 28.5 | 22 | 29 |
| Interstitial #4 | 28.5 | 31.5 | 29 | 32 |
| Segment #4 | 31.5 | 38.5 | 32 | 39 |
| Interstitial #5 | 38.5 | 41.5 | 39 | 41.5 |
| Segment #5 | 41.5 | 48.5 | 41.5 | 48.5 |
| Interstitial #6 | 48.5 | 51.5 | 48.5 | 52.5 |
| Segment #6 | 51.5 | 58.5 | 52.5 | 59.5 |
| Interstitial #7 | 58.5 | 60 | 59.5 | 60 |

The process of FIG. 7 operates to identify an anchor frame within each segment of the television program. Beginning and ending offsets relative to each anchor frame are then utilized to create beginning and ending bookmarks for the segment. Because the duration and content of each segment is the same, the beginning and the ending of the segment will be the same offset relative to the anchor frame regardless of the presentation times of the anchor frame. For example, an anchor frame for segment #1 may be 2 minutes into the segment (relative to the beginning of the segment). In NYC, this means that the anchor frame has a presentation time of 3.5 minutes into the recording. However, in Denver, the anchor frame has a presentation time of 3 minutes into the recording. Beginning and ending offsets having the same duration are still utilized in both markets, so the beginning bookmark for the NYC recording is created at a presentation time of 1.5 minutes into the recording, and the beginning bookmark for the Denver recording is created at a presentation time of 1.0 minutes into the recording. Thus, each viewer skips over different duration interstitials #1, and begins viewing the same frame of segment #1.

In at least one embodiment, the metadata that includes the strings and offsets utilized to identify the boundaries of a segment may be transmitted to a DVR through a metadata stream and the like. The data that identifies the boundaries of a segment is referred to herein as segment metadata. The show metadata, which may be delivered via a metadata stream, may include segment metadata for one or more segments of the show, and other information, such as the unique program ID (UPID) for the program. Each show may be identified by a UPID. A recording (e.g., one file recorded by a DVR between 7:00 and 8:00) may include multiple UPIDs. For example, if a television program doesn't start exactly at the hour, then the DVR may capture a portion of a program having a different UPID. The UPID allows a DVR to associate a particular show with its corresponding metadata.

Illustrated in table #4 is one exemplary format for segment metadata utilized by the processes of FIGS. 6-7. The segment metadata is carried in the segment_descriptor( ). For error handling in the case of stream corruption or censoring of offensive closed captioning by local affiliates, multiple segment_descriptor( ) may be utilized for a segment. If there are multiple segment_descriptor( ) for a given segment, then the segment_number will be the same for each but the cc_string[ ], start_offset, and end_offset will be different. Basically, alternate anchor frames may be specified for a given segment.

TABLE #4

Example of segment metadata structure.

| syntax | no. of bits | mnemonic |
|---|---|---|
| segment_descriptor( ) { | | |
| segment_tag | 8 | uimsbf |
| segment_length | 8 | uimsbf |
| segment_number | 8 | uimsbf |
| last_segment_number | 8 | uimsbf |
| cc_string_length | 8 | uimsbf |
| cc_string[ ] | cc_string_length*8 | char string |
| start_offset | 32 | uimsbf |
| end_offset | 32 | uimsbf |
| } | | | segment_tag—0×C1 segment_length—The number of bytes in the segment_descriptor( ) after this field.

segment_number—A show normally consists of multiple segments. The segment metadata will be numbered 1 to N in time order (e.g., 1=first (earliest) segment, N=last (latest) segment).

last_segment_number—The number of the last segment_number.

cc_string_length—The number of bytes in the closed captioning string (cc_string[ ]).

cc_string[ ]—The closed captioning bytes in presentation order (not transmission order). The string may include all the bytes carried in a video frame (2 or 4), and may include the bytes from multiple video frames. The string may contain closed captioning bytes from enough video frames to make the string unique within the segment.

start_offset—The number of presentation time stamps (PTS) ticks (1/90000 s) from the anchor frame to the video frame that starts the segment. The start_offset points backwards in the recording from the anchor frame.

end_offset—The number of PTS ticks from the anchor frame to the video frame that starts the interstitial immediately after the segment. The end_offset points forward in the recording.

Figure 8:
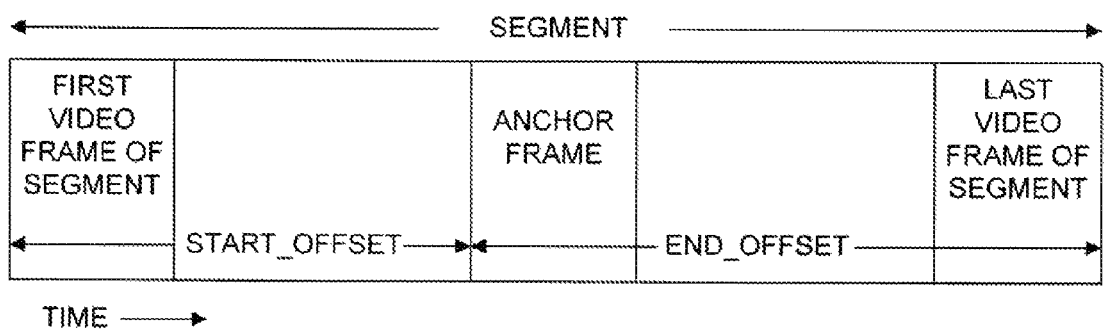
FIG. 8 illustrates the relationship between the variables of the segment metadata.

FIG. 8 illustrates the relationship between the variables of the segment metadata. However, it is to be appreciated the other exemplary data formats may be utilized for the segment metadata. FIG. 9 illustrates an example of a metadata stream transmitted to a DVR. A program_unique_id_descriptor( ) uniquely identifies the show so that the metadata stream may be associated with the correct recording file. The package type in the described example is "Show Metadata".

In at least one embodiment, the DVR records an event, and monitors the metadata stream for "Show Metadata". If corresponding metadata is found, then the metadata is processed to create segment bookmarks for the show. The segment bookmarks are then utilized to skip the interstitials of the show.

The metadata stream carrying the show metadata may be delivered at any time. Thus, the metadata stream may arrive at a DVR, before, during or after a recording is made. If the metadata stream arrives at the DVR prior to an airing of the show, then the show metadata may be saved for future use should a user later decide to record the show. If a metadata stream arrives at the DVR after the show airs, then the DVR can process the metadata stream to determine whether that particular show has been recorded. If the show has been recorded, then the DVR may begin processing the metadata stream to generate the segment bookmarks. If the show has not been recorded, then the metadata stream may be discarded if the show metadata is not needed by the DVR.

In at least one embodiment, the metadata is stored on a server and delivered responsive to a request from the DVR. For example, the DVR may request the metadata from a server when it records a selected program. The metadata is then delivered to the DVR from the server and utilized to parse the closed captioning data.

A DVR may index the closed captioning data before parsing the closed captioning data. Table 5 illustrates exemplary information utilized to index the closed captioning data.

TABLE #5

Start code detector information

| Information | Comments |
| --- | --- |
| Size | The number of closed captioning bytes in the video frame (2 or 4). |
| Closed captioning (CC) bytes | The undecoded (i.e., encoded) closed captioning bytes in the video frame. |
| PTS | The PTS of the video frame that carries the closed captioning bytes. |
| Offset | The byte offset into the transport packet stream to the first transport packet of the video frame that carries the closed captioning bytes. |

In at least one embodiment, the DVR may filter the closed captioning stream and discard pairs of NULL (value=0x80) closed captioning bytes. There may be 2 or 4 closed captioning bytes per video frame. If the frame contains 2 closed captioning bytes, and both bytes are equal to 0x80, then the bytes may be discarded and not saved. Otherwise, both closed captioning bytes are saved. If the frame contains 4 closed captioning bytes, and the first two bytes are equal to 0x80, then the first two bytes will be discarded and not saved. Otherwise, the first two closed captioning bytes are saved. If the second two bytes are equal to 0x80,then the second two bytes are discarded and not saved. Otherwise the second two closed captioning bytes are saved. The DVR may sort the closed captioning stream so that the closed captioning bytes are in the presentation order. This is because the presentation order is utilized in the segment metadata. The PTS may be used to sort the closed captioning bytes into the presentation order.

The filtered and sorted closed captioning stream may be saved to a storage medium of the DVR, and associated with the recording of the video stream. Illustrated below is an exemplary array structure for storing the filtered, sorted, and indexed closed captioning stream. However, it is to be appreciated that other storage structures may also be utilized.

```
struct cc_s
{
    int n; // number of closed captioning bytes in the closed captioning
            buffer (2 or 4)
    u8 cc[4]; // the undecoded closed captioning bytes (unsigned char
              data type)
    s64 pts; // 33-bit PTS of the video frame (long long data type)
    u64 offset;   // zero-based (0 = 1st byte) offset into the recording
};
```

As described above, segment bookmarks may be utilized to mark the beginning and ending of a segment. Table #6 illustrates exemplary information contained in the segment bookmarks. It is to be appreciated however, that the segment bookmarks may contain other information than listed in table #6.

TABLE #6

Segment bookmark information

| Information | Comments |
| --- | --- |
| Start or End flag | Designates this bookmark as starting a segment or ending a segment, |
| PTS | The PTS of the video frame that starts/ends the segment. |
| Offset | The byte offset into the recording. |

Figure 10:
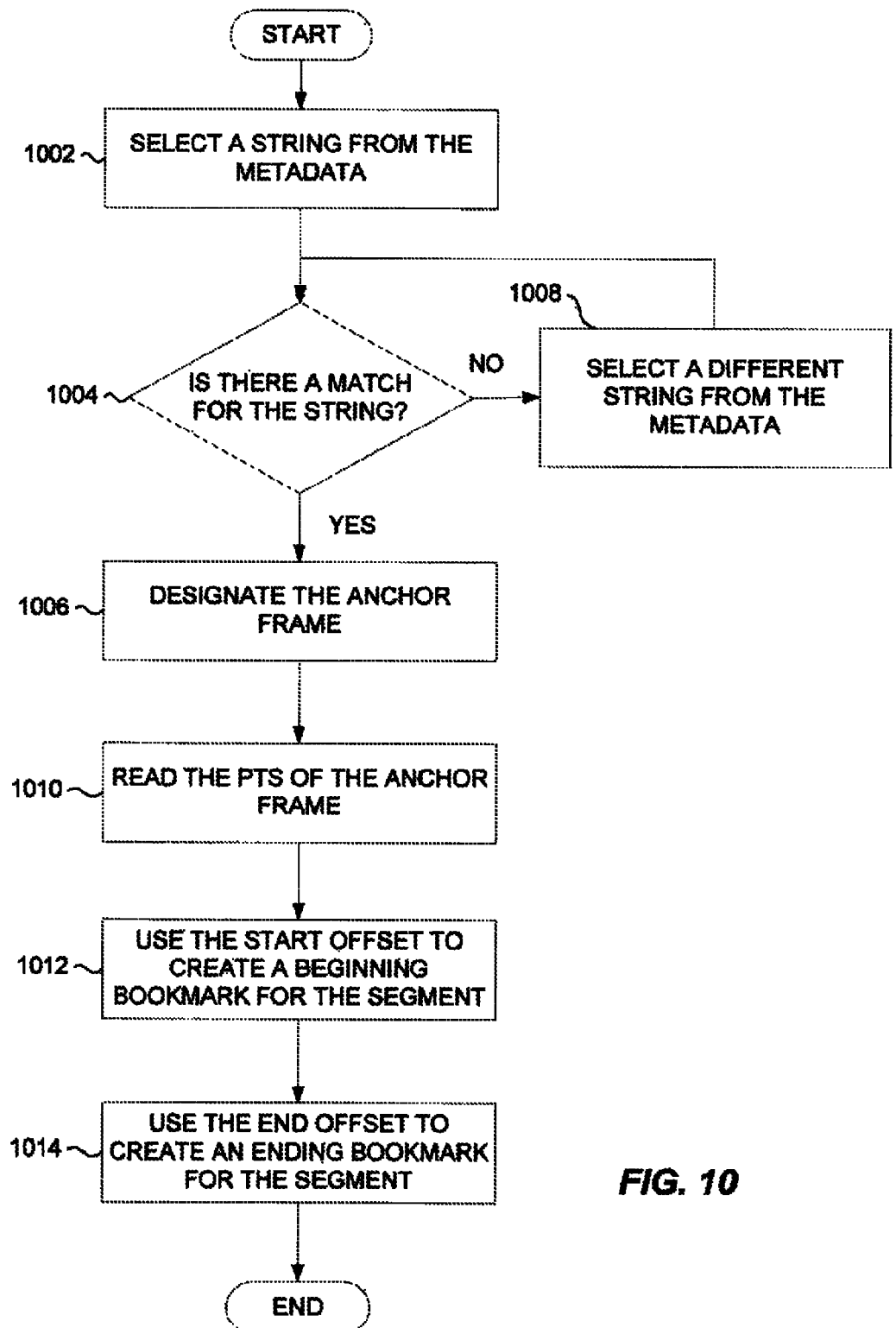
FIG. 10 illustrates an embodiment of a process for creating segment bookmarks of a recording.

FIG. 10 illustrates an embodiment of a process for creating segment bookmarks of a recording. The operation of FIG. 10 is discussed in reference to segment bookmarks for a television program. However, it is to be appreciated that the operation of the process of FIG. 10 may be applied to create segment bookmarks for other types of video stream content. Further, the operations of FIG. 10 are discussed in reference to particular data structures illustrated above. It is to be appreciated, however, that the operations of FIG. 10 may be utilized in accordance with any types of data structures and other suitable types of data. The operations of the process of FIG. 10 are not all-inclusive, and may comprise other operations not illustrated for the sake of brevity.

After recording a show, an index of the closed captioning data for the show and the show metadata associated with the program is processed to create segment bookmarks for each segment of the show. In at least one embodiment, the show metadata is processed in segment_number order, 1 to N, to create the segment bookmarks for the show.

The process includes selecting a string from the metadata for use in identifying a segment (operation 1002). This is selected from a segment_descriptor( ). The process further includes matching the cc_string[ ] from the segment_descriptor( ) to the closed captioning bytes in the index of the closed captioning data (operation 1004). If a match is found, then the video frame indexed by the closed captioning data is designated as the anchor frame (operation 1006). If a match is not found, then an alternate segment_descriptor( ), if one exists, may be utilized to select an alternate anchor frame (operation 1008), and processing continues at operation 1004. The show metadata may include multiple segment_descriptor( ) in case there are transmission problems with the closed captioning data. For example, if one or more closed captioning bytes transmitted by a content provider are not received by a DVR, then a match of a segment_descriptor( ) may not be found. Thus, an alternate segment_descriptor( ) may be utilized to locate an alternate anchor frame in the segment.

The process further includes determining the PTS of the selected anchor frame (operation 1010). The PTS may be determined from either the video stream, or through the closed captioning data index file. The process further includes creating the beginning bookmark of the segment (operation 1012). The PTS of the video frame at the start of the segment is determined by taking the PTS of the anchor frame and subtracting the start_offset from the segment_descriptor( ). The beginning bookmark points to the PTS of the video frame at the start of the segment. The process further includes creating the ending bookmark of the segment (operation 1014). The PTS of the video frame at the end of the segment is determined by taking the PTS of the anchor frame and adding the end_offset from the segment_descriptor( ). The ending bookmark points to the PTS of the video frame at the end of the segment. In at least one embodiment, modulo arithmetic is utilized to handle cases where the PTS rolls. The segment bookmarks may be created once, and utilized multiple times if the user desires to watch a program on more than one occasion. The operations of the process of FIG. 10 are repeated for any remaining segments (e.g., any remaining segment_descriptor( ) fields for segments that have not been processed).

Metadata utilized by a DVR to parse the closed captioning data may be captured and generated using a variety of techniques. The generation of metadata involves two processes, identifying transitions and boundaries between the various portions of a video stream, and the identification of text data (e.g., closed captions) that may identify portions of the video stream. It is to be appreciated that identification of the transitions may be performed through human review or through electronic content analysis of the video data of an A/V stream. Likewise, it is to be appreciated that the identification of strings that may identify portions of the presentation stream may also be performed manually by a human reviewer, or may be determined through electronic analysis of the text data of a presentation stream.

Figure 11:
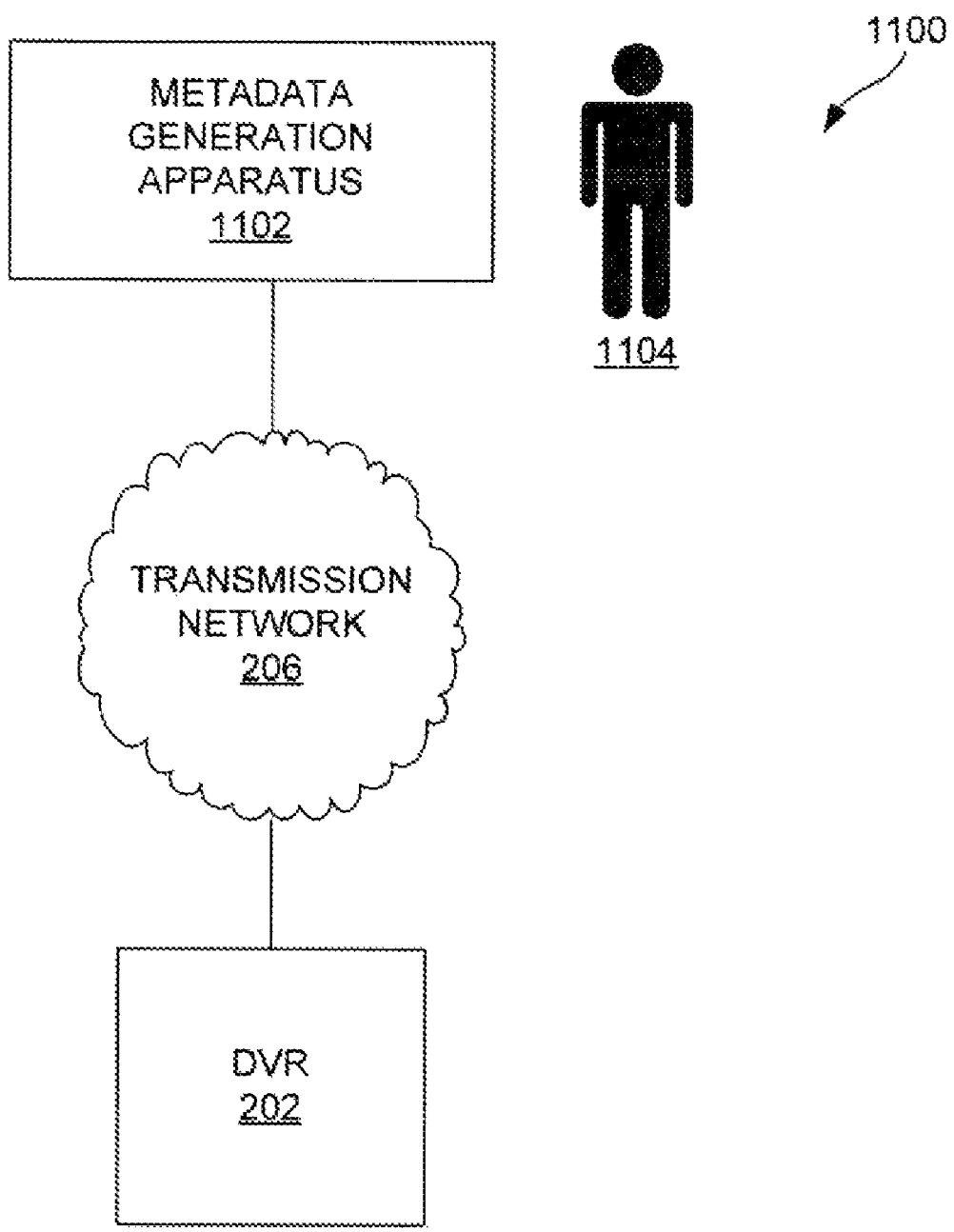
FIG. 11 illustrates an embodiment of a filtering system for generating metadata utilized by a DVR to filter content from a video stream.

FIG. 11 illustrates an embodiment of a filtering system 1100 for generating metadata utilized by a DVR to filter content from a video stream. The filtering system 1100 includes a metadata generation apparatus 1102, a transmission network 206, and a DVR 202. Each of the components will be discussed in detail below, and the discussion of components common to the figures described above is omitted for brevity.

In the filtering system 1100, a user 1104 examines a video stream to determine boundaries and transition points between the portions of the video stream. The metadata generation apparatus 1102 presents the video stream to the user 1104. The user 1104 watches the video stream, and flags desired transition points between the segments or portions of the video stream. For example, if the video stream contains a television broadcast, then the user may flag the transition between an interstitial and a segment of the television show.

After the transition points between portions of the video stream are indexed or marked, the metadata generation apparatus 1102 identifies the portions of the video stream that are to be skipped and/or presented during presentation of the video stream on the DVR 202. In at least one embodiment, the portion identifications may be performed by the metadata generation apparatus 1102 based on input from the user 1104. For example, the user 1104 may provide input identifying two transition points, and may further identify that the portion of the video stream between transition points 1 and 2 contains an interstitial of the television program. Thus, the metadata generation apparatus 1102 identifies a first segment of the television program, an interstitial of the television program, and a second segment of the television program.

The metadata generation apparatus 1102 is further configured to identify strings in the text data associated with the video stream that identify boundaries of the portions of the video stream, and/or portions of the video stream that are to be skipped and/or presented during playback of the video stream on the DVR 202. In at least one embodiment, the metadata generation apparatus 1102 parses the text data associated with the video stream to identify text strings contained within a segment of the video stream that uniquely identify the segment. In some embodiments, the metadata generation apparatus 1102 may display closed captioning data to the user 1104, and the user 1104 may provide input selecting a text string that may be used to identify a segment or portion of the video stream, and/or a boundary or transition between portions of the video stream.

An anchor frame may be identified based on the selection of the identifying text string. In at least one embodiment, the metadata generation apparatus 1102 determines offsets from the anchor frame(s) to the boundary and/or transition points of a portion or segment of the video segment. The identifying text string, offsets relative to the anchor frame and other associated data represent the metadata generated by the metadata generation apparatus 1102. The metadata is transmitted by the transmission network 206 to the DVR 202. The DVR 202 utilizes the metadata to skip portions of the video stream during presentation of the video stream by the DVR 202. In other words, the metadata instructs the DVR 202 how to parse closed captioning data to determine boundaries or transitions within a video stream.

Figure 12:
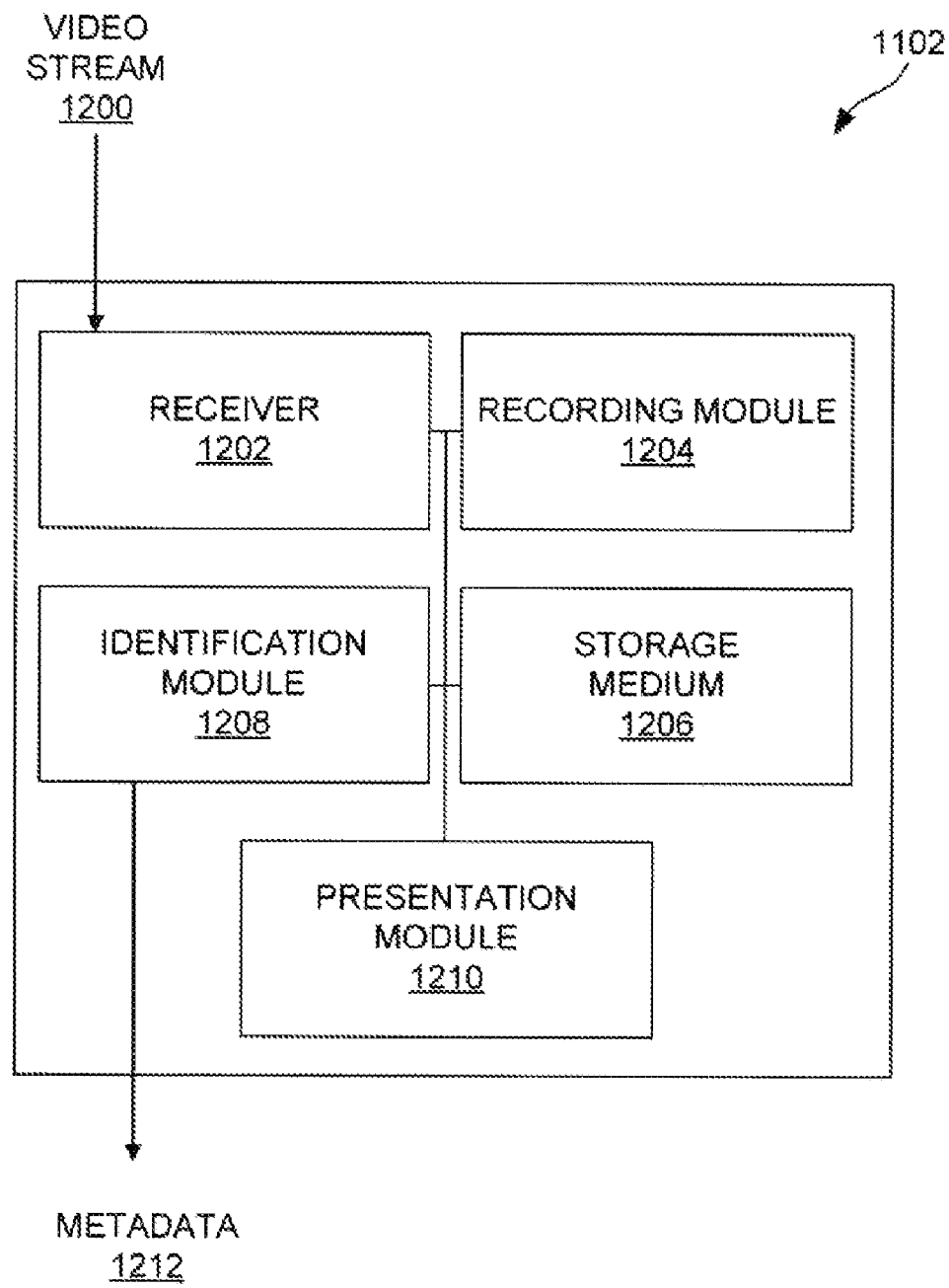
FIG. 12 illustrates an embodiment of functional components of the metadata generation apparatus of FIG. 11.

FIG. 12 illustrates an embodiment of functional components of the metadata generation apparatus 1102 of FIG. 11. FIG. 12 will be discussed in reference to the filtering system 1100 illustrated in FIG. 11. The metadata generation apparatus 1102 comprises a receiver 1202, a recording module 1204, a storage medium 1206, an identification module 1208, and a presentation module 1210. Each of these components is discussed in greater detail below.

The receiver 1202 receives a video stream 1200 from a communicatively coupled content provider (e.g., a television station or a satellite television provider). The receiver 1202 may comprise a wired or wireless receiver. In at least one embodiment, the closed captioning data is embedded within the video stream 1200. The content provider may provide a television broadcast, or other type of video stream data to the receiver 1202.

A television broadcast received by the receiver 1202 may be the same as or different than a television broadcast received by a DVR 202 (see FIG. 11). For example, the receiver 1202 may receive a first television broadcast of a television program from a first affiliate in a first time zone, and the DVR 202 may receive a second television broadcast from a second affiliate in a second time zone. The content of the television broadcasts may be different (e.g., different commercials), but the content of the segments of the show is typically the same. In other embodiments, the receiver 1202 may receive a first television broadcast of a television show during a first time slot (e.g., 7:00 P.M.), and the DVR 202 may receive and record a rerun of the television show during a second time slot (e.g., 11:00 P.M.).

The recording module 1204 receives the video stream 1200, and records the video data and text data (e.g., closed captioning data) associated with the video stream onto the storage medium 1206. The storage medium 1206 may be any type of temporary or persistent storage device capable of storing the video stream 1200 and the text data. The storage medium 1206 may be internal and/or external to the metadata generation apparatus 1102. For example, the storage medium 1206 may be an internal hard drive or flash memory. The video stream 1200 and the text data may be stored together and/or separately on the storage medium 1206.

The identification module 1208 is configured to identify transition points and/or boundaries between portions of the video stream. In at least one embodiment, the presentation module 1210 displays the video stream to the user 1104 (see FIG. 11), and the user 1104 provides input marking the boundaries and/or transition points. The presentation module 1210 may allow the user 1104 to rewind and/or fast forward video at greater than or less than normal viewing speed in order to accurately identify the frame of the video stream where the transition occurs.

The identification module 1208 is further configured to index the text data associated with a video stream according to a presentation order. In at least one embodiment, the identification module 1208 indexes the text data during the recording process. In some embodiments, the identification module 1208 may index the text data subsequent to recording. In at least one embodiment, the identification module 1208 is further configured to parse the text data to identify strings in the text data that may identify a portion or segment of the video stream 1200, or the associated transitions or boundaries of the portions of the video stream. In at least one embodiment, the identification module 1208 may present the user 1104 (see FIG. 11) with the content of the text data for selected portions or segments of the video stream using the presentation module 1210, and may allow the user 1104 to select the string(s) that they would like to utilize to identify the segment, portion of the video stream, and/or boundary or transition point of the video stream.

In at least one embodiment, the selected string may be unique within the text data for a recording, or within the text data for the segments of the show. For example, a string "Hello Bobby" may be selected because it is the only instance of that string in the closed captioning data of the show, and that particular string may occur within the first segment of the program, and thus, identifies the first segment. Selected strings may also not be unique within the text data, but may be utilized in some particular order. For example, multiple segments may begin with the phrase "We now return to the show", and the identification module 1208 may select the first occurrence of that string in the closed captioning data to identify the first segment. Likewise, a second occurrence of the string may identify the location of the second segment.

An anchor frame corresponding to the selected string is identified and used as a reference point in the video stream. In at least one embodiment, the anchor frame is chosen as the video frame showing the contents of the selected frame. However, it is to be appreciated that other techniques may be utilized to select the anchor frame. In at least one embodiment, offsets relative to the anchor frame are then calculated to the beginning and/or ending of the segment or portion of the video stream. In other words, offsets are calculated to the boundaries of a portion of the video stream, or to the transition between a segment and an interstitial of the video stream. The offsets, strings and other associated data (e.g., a UPID for a television program) are formatted into appropriate metadata 1212 and provided to a DVR 202 (see FIG. 11). It is to be appreciated that the identification module 1208 may select multiple sets of metadata 1212 for a given portion or segment of a video stream for redundancy purposes as discussed above.

Those of ordinary skill in the art will appreciate that the various functional elements 1202 through 1210 shown as operable within the metadata generation apparatus 1102 may be combined into fewer discrete elements or may be broken up into a larger number of discrete functional elements as a matter of design choice. Thus, the particular functional decomposition suggested by FIG. 12 is intended merely as exemplary of one possible functional decomposition of elements within the metadata generation apparatus 1102.

Figure 13:
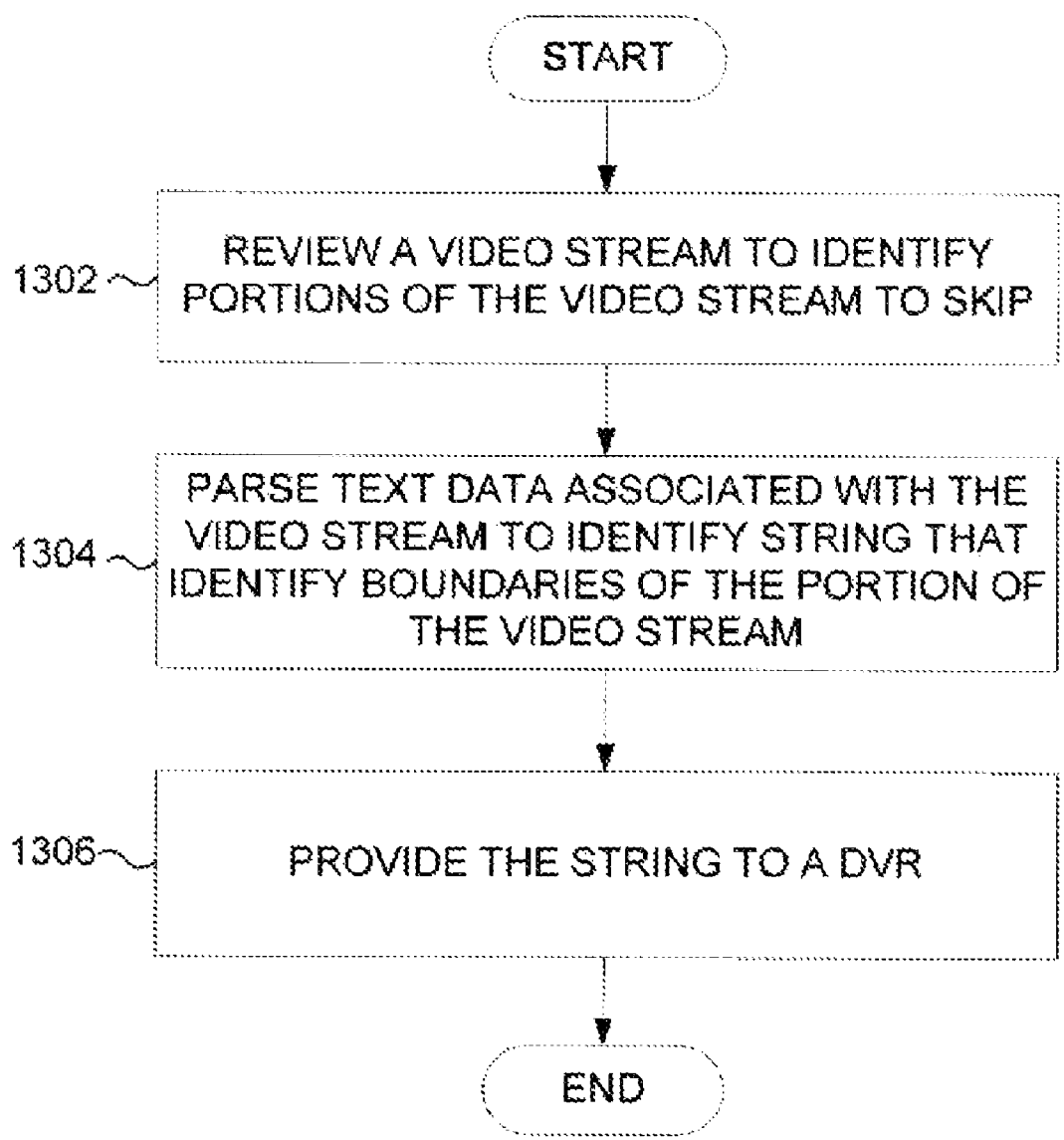
FIG. 13 illustrates a process for generating metadata utilized by a DVR to filter content from a video stream.

FIG. 13 illustrates a process for generating metadata utilized by a DVR to filter content from a video stream. The operations of the process of FIG. 13 are not all-inclusive, and may comprise other operations not illustrated for the sake of brevity.

The process includes reviewing a video stream to identify at least one portion of the video stream to skip during presentation of the video stream (operation 1302). In at least one embodiment, operation 1302 includes presenting a video stream to a user, and receiving input from the user identifying the boundaries of the portions of the video stream that are to be skipped during subsequent presentations.

The process further includes parsing text data associated with the video stream to identify a string in the text data that identifies at least one boundary of the portion of the video stream (operation 1304). In at least one embodiment, operation 1304 includes identifying a unique string in the closed captioning data, determining a location of the string the video stream, and determining an offset of the boundary relative to the location of the string.

The process further includes providing the string to a DVR (operation 1306). In some embodiments, the process further includes providing the offset to the DVR. In at least one embodiment, the string and/or the offset are broadcast to DVRs in a metadata stream, such as illustrated in FIG. 9. The DVR then utilizes the string and the offset to skip the portion of the video stream during subsequent presentation of the video stream by the DVR.

Figure 14:
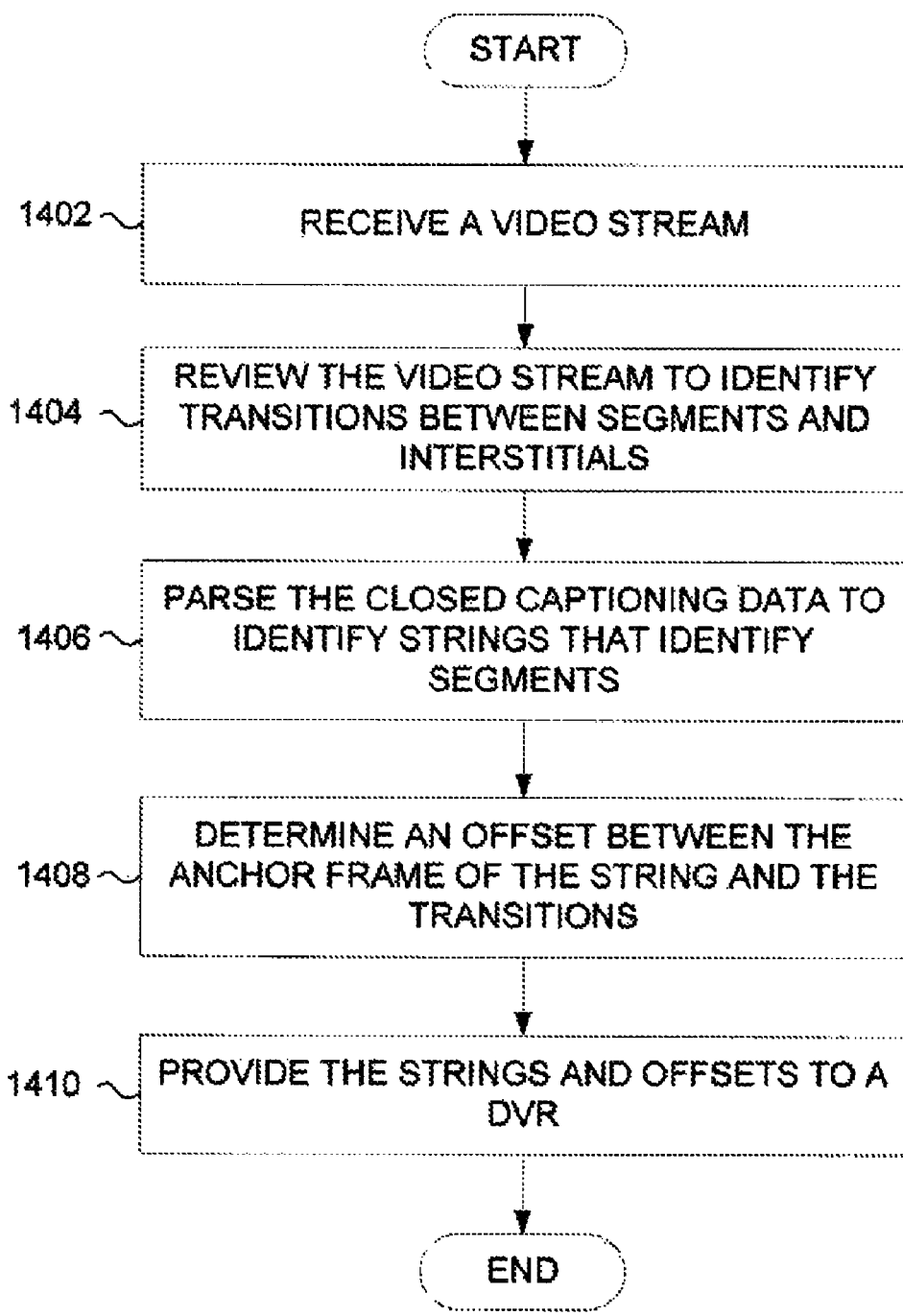
FIG. 14 illustrates a process for generating metadata utilized by a DVR to filter content from a video stream of a television show.

FIG. 14 illustrates a process for generating metadata utilized by a DVR to filter content from a video stream of a television show. The operations of the process of FIG. 14 are not all-inclusive, and may comprise other operations not illustrated for the sake of brevity.

The process includes receiving a video stream including at least one segment of the show, at least one interstitial of the show, and closed captioning data associated with the segments of the show (operation 1402). In at least one embodiment, receiving the video stream includes recording the video stream to a file so that a reviewing user may fast forward, rewind, and/or view the video stream at non-standard viewing speeds (e.g., in a slow motion mode). In at least one embodiment, the television show may be recorded during a first broadcast time (e.g., in a first time zone).

The process further includes reviewing the video stream to identify at least one transition between segments of the show and an interstitial of the show (operation 1404). In at least one embodiment, reviewing the video stream includes presenting the video stream to a user and receiving user input marking a transition between an interstitial of the show and a segment of the television show.

The process further includes parsing the closed captioning data corresponding to segments of the show to locate string(s) that identify a segment of the show within the video stream (operation 1406). The location of a string selected for a segment corresponds to an anchor frame of the segment.

The process further includes determining an offset of a transition relative to the anchor frame (operation 1408). In at least one embodiment, a first offset from the anchor frame is determined relative to a beginning transition of the segment, and a second offset from the anchor frame is determined relative to the ending transition of the segment.

The process further includes providing the string and the offset to a DVR as metadata (operation 1410). In at least one embodiment, the DVR records the show during a second broadcast time that is different than the first broadcast time. For example, the first broadcast time may be in a first time zone, and the second broadcast time may be in a second time zone.

In at least one embodiment, the DVR receives the metadata through the same transmission system as the DVR receives a television broadcast of the television show. The metadata may be transmitted to the DVR as part of a second television broadcast to the DVR. In other embodiments, the metadata is transmitted separately as a metadata stream or other types of out of band data transmissions. In some embodiments, the metadata is provided to the DVR responsive to a request by the DVR for the metadata. For example, a user may record the television program, and the DVR may then request the metadata for the television program in order to enable the skipping of interstitials of the television program.

Although specific embodiments were described herein, the scope of the invention is not limited to those specific embodiments. The scope of the invention is defined by the following claims and any equivalents therein.

What is claimed is:

1. A method for generating metadata utilized to filter content from a video stream, the method comprising:
   reviewing a video stream to identify at least one first portion of the video stream to skip during presentation of the video stream and at least one second portion of the video stream to present during presentation;
   parsing closed captioning data associated with the video stream to identify first and second text strings included within the closed captioning data, the first text string identifying a first video anchor frame associated with a first location within the video stream, the second text string identifying a second video anchor frame associated with a second location in the video stream, the first and second video anchor frames positioned within the second portion of the video stream, the first and second text strings each including multiple characters of the closed captioning data in a presentation order;
   identifying a first offset of a beginning boundary of the second portion of the video stream relative to the first video anchor frame;
   identifying a second offset of an ending boundary of the second portion of the video stream relative to the first video anchor frame;
   identifying a third offset of the beginning boundary of the second portion of the video stream relative to the second video anchor frame;
   identifying a fourth offset of the ending boundary of the second portion of the video stream relative to the second video anchor frame; and
   providing the first and second text strings and the first, second, third and fourth offsets to a digital video recorder (DVR), wherein the DVR utilizes the received multiple characters of the closed captioning data of the first text string and first and second offsets to skip the first portion of the video stream during presentation of the video stream by the DVR, the DVR further utilizing the received multiple characters of the closed captioning data of the second text string and third and fourth offsets to skip the first portion of the video stream during presentation of the video stream by the DVR in the event that the DVR is unable to locate received characters of the closed captioning data of the first text string.

2. The method of claim 1, wherein at least one of the first and second text strings is unique within the closed captioning data.

3. The method of claim 1, wherein providing the first and second text strings further comprises broadcasting a data file to the DVR in a metadata stream.

4. The method of claim 1, wherein reviewing the video stream further comprises:
   receiving user input indicating a transition between the portion of the video stream to skip during presentation of the video stream and other portions of the video stream.

5. The method of claim 1, further comprising:
   sorting closed captioning data associated with the video stream into a presentation order of the closed captioning data.

6. A method for generating metadata utilized to filter content from a television show, the method comprising:
   receiving a first video stream including at least one segment of the show, at least one first interstitial of the show, and closed captioning data associated with the at least one segment of the show, the first video stream associated with a first broadcast of the show;
   reviewing the first video stream to identify a beginning boundary and an ending boundary of the at least one segment of the show;
   parsing the closed captioning data corresponding to the at least one segment of the show to locate first and second text strings that identify the at least one segment within the first video stream, the first text string corresponding to a first anchor frame of the at least one segment, the first text string including a first set of multiple characters of the closed captioning data in a presentation order, the second text string corresponding to a second anchor frame of the at least one segment, the second text string including a second set of multiple characters of the closed captioning data in a presentation order;
   determining a first offset of the beginning boundary of the at least one segment of the show relative to the anchor frame;
   determining a second offset of the ending boundary of the at least one segment of the show relative to the anchor frame;
   determining a third offset of the beginning boundary of the second portion of the at least one segment of the show relative to the second video anchor frame;
   determining a fourth offset of the ending boundary of the second portion of the at least one segment of the show relative to the second video anchor frame; and
   providing the first and second text strings and the first, second, third and fourth offsets to a digital video recorder (DVR), wherein the DVR utilizes the received first set of multiple characters of the closed captioning data and the first and second offsets to process a second video stream associated with a second broadcast of the show to skip at least one second interstitial during presentation of the second video stream, the DVR further utilizing the received second set of multiple characters of the closed captioning data and third and fourth offsets to skip the at least one second interstitial during presentation of the second video stream by the DVR in the event that the DVR is unable to locate the second text string.

7. The method of claim 6, wherein at least one of the first and second text strings is unique within the closed captioning data for the at least one segment of the show.

8. The method of claim 6, wherein reviewing the first video stream further comprises:

presenting the first video stream to a user; and
receiving user input indicating a transition between the at least one first interstitial and the at least one segment of the first video stream.

9. The method of claim 6, wherein receiving the first video stream and parsing the closed captioning data further comprises:
recording the first video stream during the first broadcast of the show; and
parsing the recorded closed captioning data to locate the first and second text strings.

10. A method for generating metadata utilized to filter interstitials from a television show, the method comprising:
recording the show in a file during a first broadcast, the file including at least one segment of the show, at least one interstitial of the show, and closed captioning data associated with the at least one segment of the show;
reviewing video data of the file to identify a first transition between the beginning of the at least one segment of the show and the at least one first interstitial of the show;
reviewing the video data of the file to identify a second transition between the ending of the at least one segment of the show and a second interstitial of the show;
parsing the closed captioning data corresponding to the at least one segment of the show to locate first and second text strings that identify the at least one segment within the video stream, the first text string corresponding to a first anchor frame of the at least one segment, the second text string corresponding to a second anchor frame of the at least one segment, the first text string including a first set of multiple characters of the closed captioning data in a presentation order, the second text string including a second set of multiple characters of the closed captioning data in a presentation order;
determining a first offset of the first transition relative to the first anchor frame;
determining a second offset of the second transition relative to the first anchor frame;
determining a third offset of the first transition relative to the second anchor frame;
determining a fourth offset of the second transition relative to the second anchor frame; and
providing the first and second text strings and the first, second, third and fourth offsets to a digital video recorder (DVR) recording the show during a second broadcast, the second broadcast of the show including a third interstitial in place of the first interstitial, wherein the DVR utilizes the received first set of multiple characters of the closed captioning data and the first and second offsets to skip the third interstitial during presentation of the show and utilizes the received second set of multiple characters of the closed captioning data and the third and fourth offsets to skip the third interstitial during presentation of the show in the event that the DVR is unable to locate the received first set of characters of the closed captioning data.

11. The method of claim 10, wherein the first broadcast is in a first time zone on a first channel, and the second broadcast is in a second time zone on a second channel, wherein the first interstitial has a different time length than the third interstitial.

12. The method of claim 10, wherein at least one of the first and second text strings are unique within the closed captioning data for the at least one segment of the show.

13. A system comprising:
a metadata generation apparatus including:
a receiver that receives a first television broadcast of a television show, the first television broadcast including at least one segment of the show, at least one first interstitial of the show, and closed captioning data associated with the at least one segment of the show;
a presentation module that presents the first television broadcast to a user;
an identification module that receives user input identifying a first transition between the at least one first interstitial of the show and the at least one segment of the show and that receives user input identifying a second transition at the end of the at least one segment, that parses the closed captioning data corresponding to the at least one segment of the show to locate first and second text strings that identify the at least one segment within the television show, the first text string corresponding to a first anchor frame of the at least one segment, the first text string including a first set of multiple characters of the closed captioning data in a presentation order, the second text string corresponding to a second anchor frame of the at least one segment, the second text string including a second set of multiple characters of the closed captioning data in a presentation order, the identification module determining a first offset of the first transition relative to the first anchor frame, a second offset of the second transition relative to the first anchor frame, a third offset of the first transition relative to the second anchor frame and a fourth offset of the second transition relative to the second anchor frame; and
a transmission network communicatively coupled to the identification module that provides the first and second text strings and the first, second, third and fourth offsets to a digital video recorder (DVR), the DVR operating to record a second television broadcast of the show, the second television broadcast including a second interstitial following the at least one segment, the second interstitial comprising at least a portion of different content than the first interstitial, wherein the DVR utilizes the received first set of multiple characters of the closed captioning data and the first and second offsets to skip the second interstitial during presentation of the television show, the DVR further utilizing the received second set of multiple characters of the closed captioning data of the second text string and third and fourth offsets to skip second interstitial during presentation of the television show in the event that the DVR is unable to locate the received first set of characters of the closed captioning data of the first text string.

14. The system of claim 13, wherein at least one of the first and second text strings are unique within the closed captioning data for the at least one segment of the show.

15. The system of claim 13, wherein a recording module of the metadata generation apparatus records the first television broadcast to a storage medium, and wherein the presentation module presents the recorded first television broadcast to the user.

16. The system of claim 13, wherein the transmission network provides the second television broadcast of the television show to the DVR.

17. The system of claim 16, wherein the transmission network provides the first television broadcast to the metadata generation apparatus.

18. The system of claim 16, wherein the transmission network provides the first and second text strings and the first, second, third and fourth offsets to the DVR as a broadcast.

19. The system of claim 13, wherein the transmission network provides the first and second text strings and the first, second, third and fourth offsets to the DVR responsive to a request from the DVR.

20. The system of claim 13, wherein the first television broadcast is on a first channel, and the second television broadcast is on a second channel, wherein the first interstitial has a different time length than the third interstitial.

* * * * *